US010187332B2

(12) United States Patent
Killoran, Jr. et al.

(10) Patent No.: US 10,187,332 B2
(45) Date of Patent: *Jan. 22, 2019

(54) GENERATION AND RETRIEVAL OF REPORT INFORMATION

(71) Applicant: CLOVER LEAF ENVIRONMENTAL SOLUTIONS, INC., Albuquerque, NM (US)

(72) Inventors: John P. Killoran, Jr., Albuquerque, NM (US); Gina Katharine Von Damm, Davis, CA (US); Dennis William Peek, Albuquerque, NM (US); Angela Kirkman, Albuquerque, NM (US)

(73) Assignee: CLOVER LEAF ENVIRONMENTAL SOLUTIONS, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,516

(22) Filed: Aug. 23, 2017

(65) Prior Publication Data

US 2017/0353407 A1 Dec. 7, 2017

Related U.S. Application Data

(63) Continuation of application No. 15/180,584, filed on Jun. 13, 2016, now Pat. No. 9,762,512, which is a
(Continued)

(51) Int. Cl.
*G06F 15/16* (2006.01)
*H04L 12/58* (2006.01)
(Continued)

(52) U.S. Cl.
CPC ........ *H04L 51/02* (2013.01); *G06F 17/30386* (2013.01); *G06F 17/30876* (2013.01);
(Continued)

(58) Field of Classification Search
CPC ......... H04L 51/02; H04L 51/30; H04L 51/34; G06F 17/30386; G06F 17/30876; G06Q 10/063112
(Continued)

(56) References Cited

U.S. PATENT DOCUMENTS 5,426,781 A 6/1995 Kaplan et al.
5,664,110 A 9/1997 Green et al.
(Continued)

FOREIGN PATENT DOCUMENTS

WO 2006119342 A2 11/2006

OTHER PUBLICATIONS

Truxa, Ivo, MIVA®Merchant: MmPGP Secure PGP Email Merchant Notification Module, http://mivotruxoft.com/mm0001.htm, Jan. 21, 2011, pp. 1-10.

*Primary Examiner* — Melvin H Pollack
(74) *Attorney, Agent, or Firm* — Volpe and Koenig, P.C.

(57) ABSTRACT

An information management system may store information related to tasks to be performed by one or more individuals. The individuals may communicate with the information management system using email messages. The information management system may not require a login procedure, and individuals may interact with the information management system without the need to log in to the information management system. The information management system may receive an email message from an individual that indicates a request for a report. The information management system may determine whether to transmit the report to the individual based on whether they are appropriately registered with the information management system, and/or whether they have administrative privileges. The information management system, in response to a positive determination,
(Continued)

may transmit the report to the email address from which the requesting email message was sent.

12 Claims, 15 Drawing Sheets

Related U.S. Application Data continuation of application No. 14/577,140, filed on Dec. 19, 2014, now Pat. No. 9,369,423, which is a continuation of application No. 12/896,644, filed on Oct. 1, 2010, now Pat. No. 8,918,467.

(51) Int. Cl.
  *G06Q 10/06* (2012.01)
  *G06F 17/30* (2006.01)
(52) U.S. Cl.
  CPC ...... *G06Q 10/063112* (2013.01); *H04L 51/30* (2013.01); *H04L 51/34* (2013.01)
(58) Field of Classification Search
  USPC .......................................................... 709/206
  See application file for complete search history.

(56) References Cited

U.S. PATENT DOCUMENTS

| | | | |
|---|---|---|---|
| 5,694,546 A | 12/1997 | Reisman | |
| 5,706,442 A | 1/1998 | Anderson et al. | |
| 5,710,887 A | 1/1998 | Chelliah et al. | |
| 5,758,328 A | 5/1998 | Giovannoli | |
| 5,793,972 A | 8/1998 | Shane | |
| 5,794,206 A | 8/1998 | Wilkinson et al. | |
| 5,799,157 A | 8/1998 | Escallon | |
| 5,809,242 A | 9/1998 | Shaw et al. | |
| 5,825,881 A | 10/1998 | Colvin, Sr. | |
| 5,826,242 A | 10/1998 | Montulli | |
| 5,826,269 A | 10/1998 | Hussey | |
| 5,838,790 A | 11/1998 | McAuliffe et al. | |
| 5,848,397 A | 12/1998 | Marsh et al. | |
| 5,855,008 A | 12/1998 | Golhaber et al. | |
| 5,864,823 A | 1/1999 | Levitan | |
| 5,870,717 A | 2/1999 | Wiecha | |
| 5,890,138 A | 3/1999 | Godin et al. | |
| 5,897,622 A | 4/1999 | Blinn et al. | |
| 5,899,980 A | 5/1999 | Wilf et al. | |
| 5,905,973 A | 5/1999 | Yonezawa et al. | |
| 5,970,469 A | 10/1999 | Scroggie et al. | |
| 6,101,485 A | 8/2000 | Fortenberry et al. | |
| 6,246,996 B1 | 6/2001 | Stein et al. | |
| 6,938,048 B1 | 8/2005 | Jilk et al. | |
| 6,954,737 B2 | 10/2005 | Kalantar et al. | |
| 6,993,559 B2 | 1/2006 | Jilk et al. | |
| 7,533,064 B1 | 5/2009 | Boesch | |
| 7,577,587 B2 | 8/2009 | Gee | |
| 7,912,910 B2 | 3/2011 | Banerjee et al. | |
| 8,156,012 B1 | 4/2012 | Eisner et al. | |
| 8,260,274 B2 * | 9/2012 | Moshir .................. G06F 21/35 455/414.3 | |
| 8,335,704 B2 | 12/2012 | Trefler et al. | |
| 8,386,570 B2 | 2/2013 | Yanagi et al. | |
| 8,510,392 B2 | 8/2013 | Ordille et al. | |
| 8,516,062 B2 * | 8/2013 | Killoran, Jr. ............ H04L 51/28 709/204 | |
| 8,583,731 B1 * | 11/2013 | Jones ...................... H04L 51/12 709/204 | |
| 8,656,167 B2 | 2/2014 | Bono et al. | |
| 8,660,537 B2 | 2/2014 | Lewis et al. | |
| 8,666,993 B2 * | 3/2014 | Chunilal ........... G06F 17/30861 705/14.54 | |
| 8,713,146 B2 | 4/2014 | Pedersen | |
| 8,744,885 B2 | 6/2014 | Johnson | |
| 8,767,593 B1 | 7/2014 | Allen et al. | |
| 8,781,923 B2 | 7/2014 | Pitroda et al. | |
| 8,781,998 B2 * | 7/2014 | Jafri ................. G06Q 10/06316 707/608 | |
| 8,805,879 B2 * | 8/2014 | Kelley ................... G06Q 10/06 707/779 | |
| 8,868,660 B2 | 10/2014 | Hastings et al. | |
| 8,918,467 B2 * | 12/2014 | Killoran, Jr. ...... G06Q 10/06311 709/204 | |
| 8,949,351 B2 * | 2/2015 | Ciancio-Bunch .... G06Q 10/107 709/206 | |
| 8,959,159 B2 * | 2/2015 | Vitaldevara .......... G06Q 10/107 709/206 | |
| 9,081,501 B2 | 7/2015 | Asaad et al. | |
| 9,152,946 B2 | 10/2015 | Rankin, Jr. et al. | |
| 9,317,849 B2 | 4/2016 | Pitroda et al. | |
| 9,318,108 B2 * | 4/2016 | Gruber ............... G10L 15/1815 | |
| 9,369,413 B2 | 6/2016 | Borna | |
| 9,369,423 B2 * | 6/2016 | Killoran, Jr. ...... G06Q 10/06311 | |
| 9,461,890 B1 | 10/2016 | Nair et al. | |
| 9,471,899 B2 * | 10/2016 | Beyer ................. G06Q 10/107 | |
| 9,537,933 B2 * | 1/2017 | Beck ....................... H04L 51/12 | |
| 9,626,685 B2 * | 4/2017 | Martinez ................ G06Q 30/02 | |
| 9,680,803 B2 * | 6/2017 | Moshir ............... H04L 63/0464 | |
| 9,690,460 B2 * | 6/2017 | Audet ................... G06F 3/04842 | |
| 9,762,512 B2 * | 9/2017 | Killoran, Jr. ...... G06Q 10/06311 | |
| 9,767,302 B2 * | 9/2017 | Lim ................... G06F 21/6218 | |
| 9,830,340 B2 * | 11/2017 | Gradin ............. G06F 17/30289 | |
| 9,866,594 B2 * | 1/2018 | Lim ........................ H04L 63/20 | |
| 2002/0010746 A1 | 1/2002 | Jilk et al. | |
| 2002/0065828 A1 | 5/2002 | Goodspeed | |
| 2002/0103752 A1 | 8/2002 | Berger et al. | |
| 2002/0120581 A1 | 8/2002 | Schiavone et al. | |
| 2002/0178360 A1 | 11/2002 | Wencour et al. | |
| 2003/0217107 A1 | 11/2003 | Perry | |
| 2004/0024655 A1 | 2/2004 | Estes | |
| 2005/0044003 A1 | 2/2005 | O'Keeffe et al. | |
| 2005/0251460 A1 | 11/2005 | Quigley | |
| 2006/0015564 A1 | 1/2006 | Angelica | |
| 2006/0168259 A1 | 7/2006 | Spilotro et al. | |
| 2007/0022007 A1 | 1/2007 | Lawe | |
| 2009/0254447 A1 | 10/2009 | Blades | |
| 2009/0276345 A1 | 11/2009 | Hughes | |
| 2009/0300127 A1 | 12/2009 | Du | |
| 2010/0010886 A1 | 1/2010 | Flynn, Jr. | |
| 2011/0202615 A1 | 8/2011 | Fletcher | |
| 2011/0264555 A1 | 10/2011 | Turne-Rielle | |
| 2011/0295749 A1 | 12/2011 | Scalisi | |
| 2012/0109781 A1 | 5/2012 | Felt et al. | |
| 2012/0276868 A1 | 11/2012 | Martell | |
| 2013/0144951 A1 | 6/2013 | Viswanath et al. | |
| 2014/0249937 A1 | 9/2014 | McNally | |
| 2016/0196587 A1 * | 7/2016 | Eder ........................ G06Q 30/00 705/14.49 | |
| 2017/0118148 A1 | 4/2017 | Tomkow | |
| 2017/0236164 A1 * | 8/2017 | Corts .................. G06Q 30/0272 705/14.61 |

\* cited by examiner

GENERATION AND RETRIEVAL OF REPORT INFORMATION

CROSS-REFERENCE TO RELATED APPLICATIONS

This application is a continuation of U.S. patent application Ser. No. 15/180,584, filed Jun. 13, 2016, which is a continuation of U.S. patent application Ser. No. 14/577,140, filed Dec. 19, 2014, which issued as U.S. Pat. No. 9,369,423 on Jun. 14, 2016, which is a continuation of U.S. patent application Ser. No. 12/896,644, filed Oct. 1, 2010, which issued as U.S. Pat. No. 8,918,467 on Dec. 23, 2014, which is related to U.S. patent application Ser. No. 13/970,177, filed Aug. 19, 2013, which issued as U.S. Pat. No. 9,729,491 on Aug. 8, 2017, which is a continuation of U.S. patent application Ser. No. 12/896,533, filed Oct. 1, 2010, which issued as U.S. Pat. No. 8,516,062 on Aug. 20, 2013, the contents of which are hereby incorporated by reference herein.

TECHNICAL FIELD

The subject matter disclosed herein relates to information management.

BACKGROUND

An organization, such as a military unit, commercial enterprise, or other type of organization, may be required to periodically perform one or more tasks in order to achieve goals and/or comply with requirements associated with their particular domain. As one example, a commercial enterprise or military unit may be required to comply with environmental regulations. Conformance to the environmental regulations may require the periodic performance of tasks such as inspecting hazardous waste accumulation areas, complete hazardous material inventories, updating or maintaining environmental records, and/or other tasks.

Current information management systems allow organizations to define tasks, assign tasks to workers, and monitor completion of the tasks that have been assigned to workers. However, these information management systems are difficult to use, unnecessarily complex, and frequently include many features that are not of interest to the user. Further, these information management systems typically include their own log in and/or authentication mechanisms, thereby adding an additional layer of complexity and inconvenience to their use. Therefore, new information management technologies are required that provide a more streamlined and straightforward user experience than what is provided in the current technologies.

SUMMARY

An information management system may store information related to tasks to be performed by workers in an organization, and may transmit information to the workers regarding tasks they are expected to perform. Further, the information management system may receive information from the workers regarding the progress of the performance of tasks, such as whether a particular task has been completed or is still in progress. The information management system may also receive requests to generate reports regarding task progress across the organization, and communicate the generated reports to workers. Communication between the workers and the information management system may be performed using email messages. The information management system may not require a login or authentication procedure that is specific to the information management system, and workers may interact with the information management system without logging in to the information management system.

The information management system may be included in an architecture that also includes one or more client modules such as an email client module and/or a report display module that are used by a worker in the organization. The information management system may receive an email message from a worker that indicates a request for a report. The information management system may determine whether to transmit the report to the worker based on whether the worker is appropriately registered with the information management system (i.e., whether the email address from which the request is sent is stored in a database managed by the information management system). The determination may also be based on whether the worker has administrative privileges in the information management system. The information management system, in response to a positive determination, may transmit the report to the email address from which the requesting email message was sent.

BRIEF DESCRIPTION OF THE DRAWINGS

A more detailed understanding may be had from the following description, given by way of example in conjunction with the accompanying drawings wherein.

DETAILED DESCRIPTION

Figure 1:
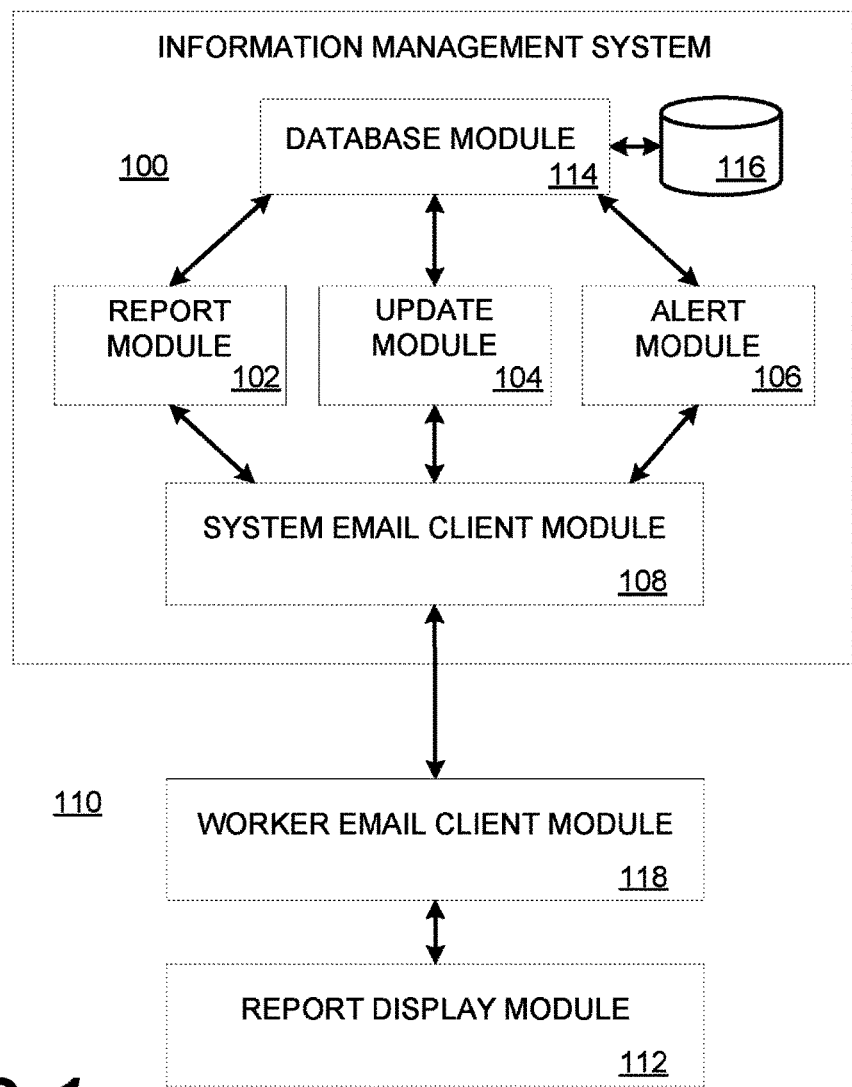
FIG. 1 shows an example architecture that may be used for the communication, storage, and display of information related to task management.

FIG. 1 shows an example architecture 110 that may be used for the communication, storage, and display of information related to task management. The example architecture 110 includes an information management system 100 and a worker email client module 118. As will be described in further detail below, the information management system 100 may store information related to tasks to be performed by workers in an organization, and may transmit information to the workers regarding tasks they are expected to perform. Further, the information management system 100 may receive information from the workers regarding the progress of the performance of tasks (e.g., whether a particular task has been completed or is still in progress). The information management system 100 may also generate reports regarding task progress across the organization, and communicate the reports to workers.

The information management system 100 may include a report module 102, an update module 104, an alert module 106, a system email client module 108, a report display module 112, a database module 114, and a task information database 116. The task information database 116 may store information related to one or more tasks, one or more organizations, and one or more workers, and/or other task-related information. The database module 114 may perform functionality such as adding data to, modifying data in, querying data from, and/or retrieving data from the task information database 116.

The alert module 106 may perform functionality such as determining when an alert message related to a task should be sent to a worker. An alert message may indicate, for example, that the worker is required to complete a task and/or what the worker is required to perform in order to complete the task.

The system email client module 108 may perform functionality such as the transmission and reception of email messages. The system email client module 108 may be configured to use one or more email accounts that are associated with the information management system 100, and to receive messages associated with the one or more email accounts. As an example, when the alert module 106 makes a determination that an alert message should be sent to a worker, the alert module 106 may communicate the contents of the email message to the system email client module 108, and the system email client module 108 may transmit a corresponding email message. Further, when a new email message is received at an email account used by the system email client module 108, the system email client module 108 may communicate the email messages to the update module 104 and/or the report module 102.

The update module 104 may perform functionality related to updating the task information database 116 based on emails from workers that are received by the system email client module 108. For example, the update module 104 may periodically check the system email client module 108 to determine if a new email message has been received. If the update module 104 determines that an email message indicates that a task has been completed, the update module 104 (in conjunction with the database module 114) may update the task information database 116 accordingly.

The report module 102 may perform functionality related to providing reports to workers in the organization. For example, the report module 102 may periodically check the system email client module 108 to determine if a new email message has been received. If the report module 102 determines that a new email message has been received that indicates a request for a report from a worker, the report module 102 may generate the corresponding report, and may communicate the report to the system email client module 108. The system email client module 108 may then transmit a corresponding email message that includes the report to the worker that requested the report. The report display module 112 may then display the report via a display device (not depicted).

The worker email client module 118 may perform functionality related to the communication and display of email messages. The worker email client module 118 may be configured to use an email account that is associated with a worker in the organization, and to receive messages associated with the email account.

The system email client module 108 and/or the worker email client module 118 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The system email client module 108 and/or the worker email client module 118 may be or include an email client such as Microsoft Outlook, Thunderbird, a web browser, or any other client application for the communication of email messages. The system email client module 108 and/or worker email client module 118 may communicate email messages via one or more email servers (not depicted).

The task information database 116 may be spread across one or any number of computer-readable storage media (not depicted). The task information database 116 may be or include, for example, a relational database, a hierarchical database, an object-oriented database, a flat file, a spreadsheet, or a structured file. The database module 114 may interface with a database management system (not depicted) in order to add data to, modify data in, or obtain data from the task information database 116. Alternatively or additionally, the database module 114 may perform database drive and/or database client functionality to interact with the database management system. The database management system may be based on a technology such as Microsoft SQL Server, Microsoft Access, MySQL, PostgreSQL, Oracle Relational Database Management System (RDBMS), or any other appropriate technology.

The task information database 116 may include data that describes tasks in terms of "recurrences." A "recurrence" is an instance of a performance of a task. As an example, an organization may be required update its hazardous material inventories once per month. In this example, the "task" is updating hazardous material inventories, and the task is associated with a "recurrence" for each month. The task information database 116 may therefore include information that indicates that the task is associated with a recurrence each month. Further, for each task, the task information database 116 may include information such as one of or any combination of the following: an identifier of the task; a name of the task; a description of the task; an area related to the task; a date on which the task is due; an end date for the task; one or more alert dates that indicate when alert messages related to the task should be sent; files that are related to the task; an identifier of a worker to whom the task should be escalated if the task is not timely completed; recurrence information; and/or other information. Recurrence information for a task may include, for example, how often a task recurs, in which week a task recurs, on what day a task recurs, and/or other information.

For each recurrence of a task, the task information database 116 may include information such as one of or any combination of the following: an identifier of the recurrence; an identifier of the associated task; a date on which the task/recurrence must be performed; one or more dates on which alerts related to the recurrence should be sent; information that indicates whether alerts related to the recurrence have been sent; an identifier of the worker assigned to perform the task/recurrence; information that indicates when and/or if information an escalation email was sent; information related to performance of the task/recurrence; and/or other information. Information related to performance of the task/recurrence may include, for example, information that indicates that the task has been completed or is still in progress, a time at which the worker indicated that the recurrence was completed or is still in progress, an identifier of the worker who completed the recurrence, and/or comments from the worker related to progress of the performance of the recurrence. A spell-checker module (not depicted) in the information management system 100 may periodically perform spelling and grammar corrections on the comments that are included in the task information database 116.

For each worker, the task information database 116 may include information such as one of or any combination of the following: an identifier; a first name; a last name; a position title or job description; an email address; one or more phone numbers; one or more fax numbers; an identifier of the organization with which the worker is associated; and/or other information. The information may also include privileges and/or security information, such as whether the worker is authorized as an administrator and/or what level of privileges are possessed by the worker. The task information database 116 may also include information that describes one or more email signatures associated with the worker.

For each organization in the task information database 116, information may be stored such as: an identifier of the organization; a name of the organization; a description of the organization; and/or other information. The task information database 116 may also include information that describes facilities that are associated with an organization. For each facility in the task information database 116, the task information database 116 may include information such as the name of the facility and the address of the facility. The task information database 116 may also include information that indicates which facility a worker is associated with.

Each or any combination of the modules 102, 104, 106, 108, 112, 114, 118 may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure.

Further characteristics of the modules 102, 104, 106, 108, 112, 114, 118 are described below with references to FIGS. 2A-12.

Figure 2A:
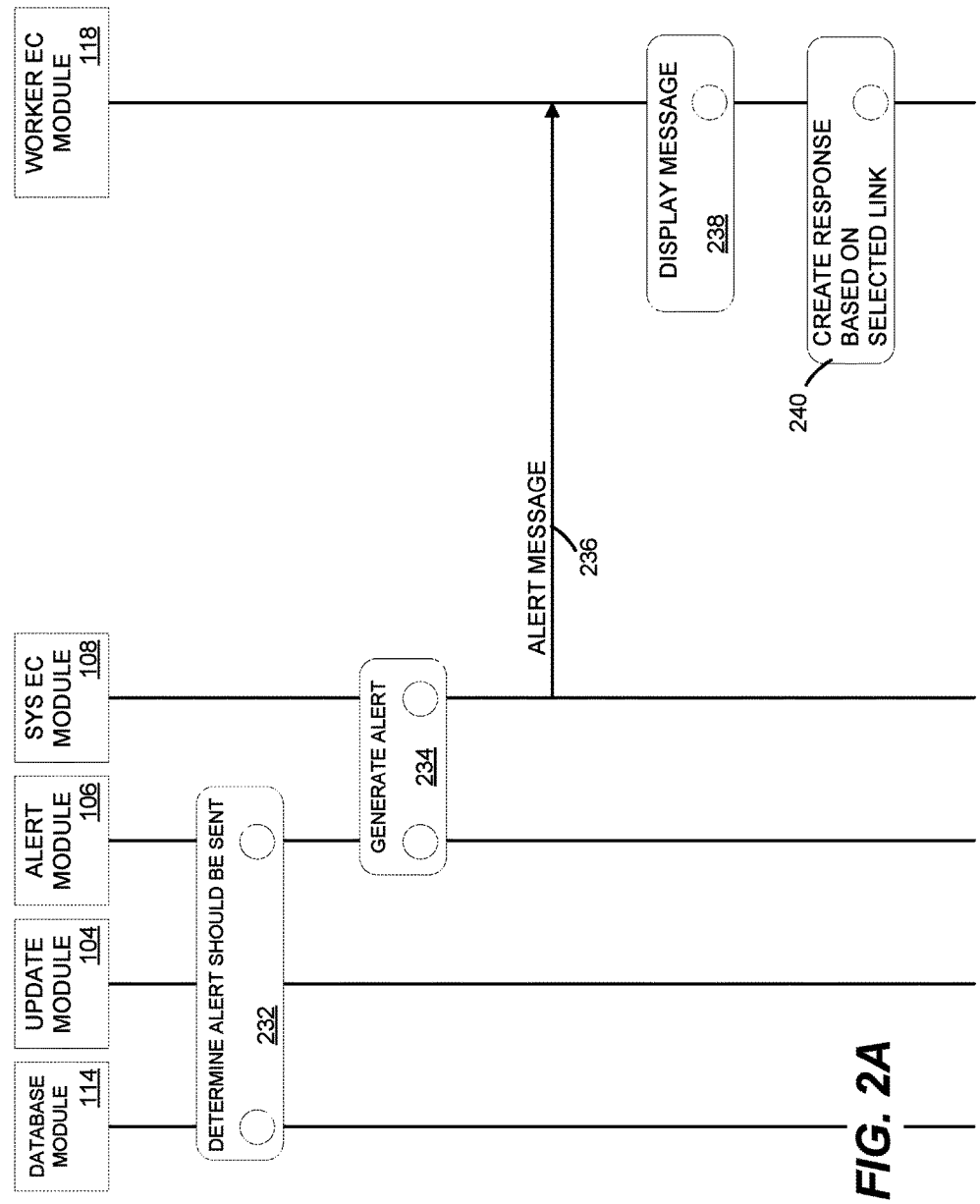
FIGS. 2A-2B show a method for the communication of an alert message to a worker and for updating the task information database 116 based on a response to the alert message
Figure 2B:
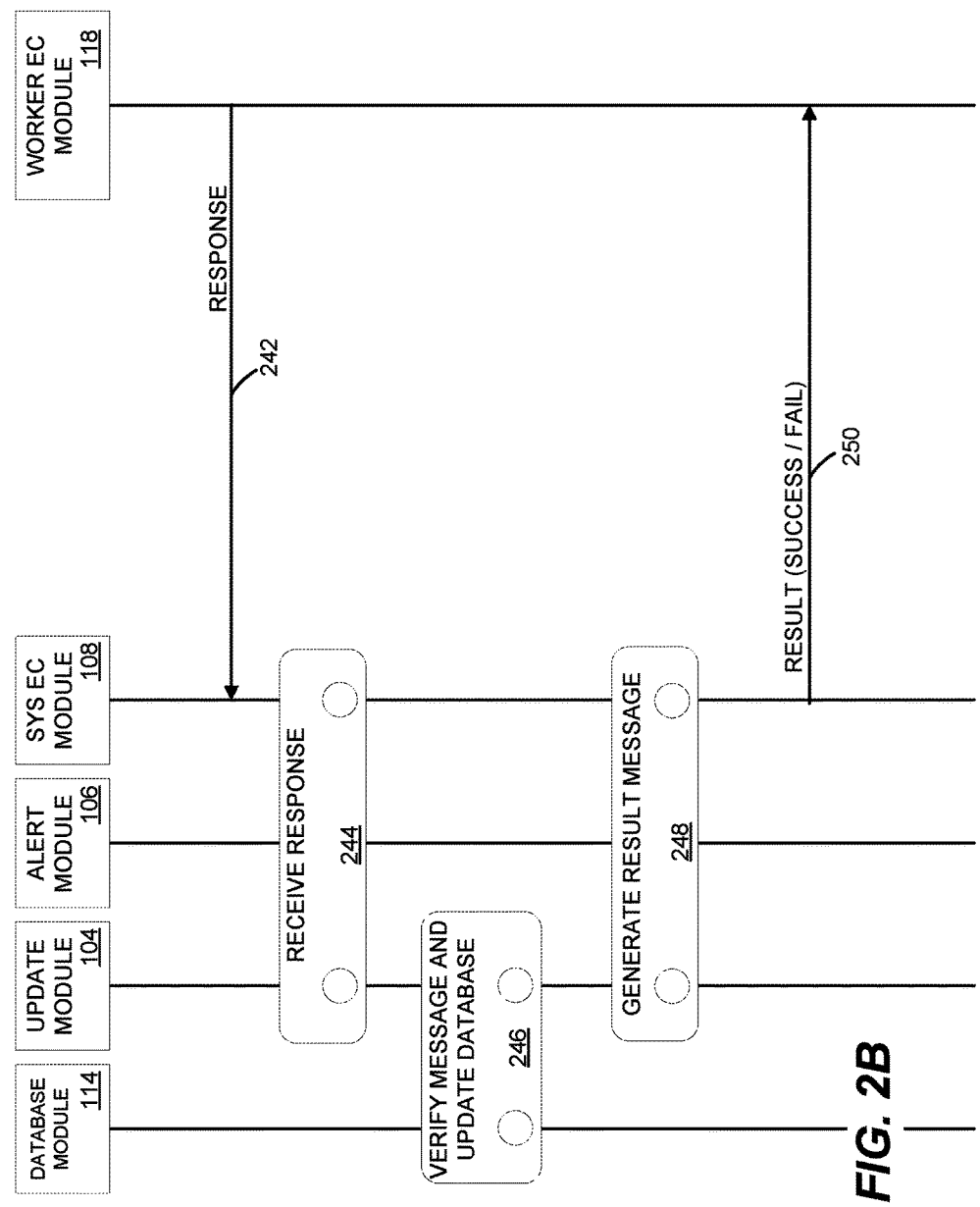

FIGS. 2A-2B show a method for the communication of an alert message to a worker and for updating the task information database 116 based on a response to the alert message. As will be described in further detail below, the alert message may indicate that a task recurrence is expected to be performed by the worker. FIGS. 2A-2B show the database module 114, the update module 104, the alert module 106, the system email client module 108, and the worker email client module 118.

The method of FIGS. 2A-2B may begin with the alert module 106 determining that an alert related to a task recurrence should be sent (step 232). This determination may be performed based on data obtained via the database module 114 from the task information database 116. As one example, the alert module 106 may receive information from the task information database 116 that indicates that, for a particular task recurrence, an alert email is past due and has not been sent.

The alert module 106 and/or the system email client module 108 may then generate an email message to be transmitted to the worker assigned to perform the recurrence of the task (step 234). The email message may describe the task recurrence to be performed. The email message may also include one or more attachments that provide information regarding the task recurrence to be performed. The email message may be indicate that it is being sent by one of the email accounts used by the system email client module 108. Further, the email message may include one or more hyperlinks that, when clicked by the worker, will create a new email message that the worker may use to respond to the email message generated by the alert module 106 and/or system email client module 108.

The system email client module 108 may then transmit the generated email message (step 236). The email message may be received by the worker email client module 118, and displayed by the worker email client module 118 (step 238).

Figure 3:
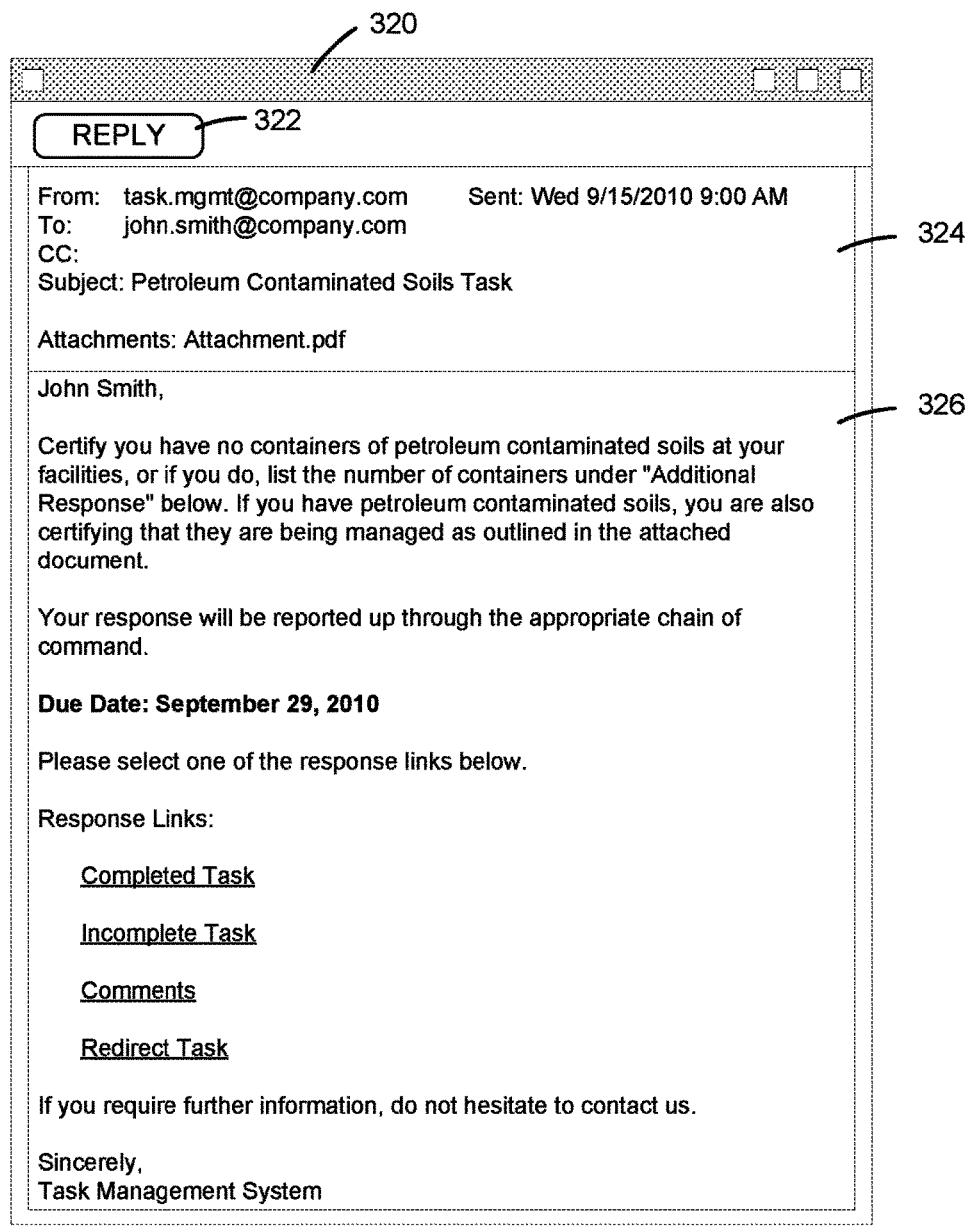
FIG. 3 shows an example email display window that may be used to display an email message.

Referring now to both FIG. 2A and FIG. 3, FIG. 3 shows an example email display window 320 that may be used by the worker email client module 118 to display the email message (step 238). The email display window 320 of FIG. 3 includes a Reply button 322, a control area 324, and a message body area 326. The control area 324 may display control and/or header information associated with the email message, such as the email addresses of the sender and recipient of the message. As an example, the control area 324 shows that the sender of the message has the email address "task.mgmt@company.com." This is an example email address that may be associated with an account used by the information management system 100 for the communication of email messages. Further to this example, the control area 324 shows that the email address of the worker assigned to perform the task recurrence is "john.smith@company.com." The control area 324 may also display information such as a subject of the email message and the time the email message was sent. The control area 324 may also display information that indicates whether any attachments are associated with the email message. The Reply button 322 may respond to user input to generate a new display element (not depicted) to respond to the email message.

The message body area 326 may display the body of the email message. As shown in FIG. 3, the message body area 326 display an example email message that describes a task recurrence to be performed by an example worker named John Smith.

The message body area 326 may also include one or more Uniform Resource Identifiers (URIs) or hyperlinks, such as the "Completed Task" link, the "Incomplete Task" link, the "Comments" link, and/or the "Redirect Task" link. These links may be defined according to the mailto URI scheme or other appropriate format, and each may describe a new email message that may be generated by the worker email client module 118 when that link is selected. A mailto URI scheme may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a blind copy of the new message should be sent; a field that indicates the subject of the new message; and a field that indicates the body of the new message. A mailto hyperlink may be defined according to the format described in Internet Engineering Task Force (IETF) RFC2368.

Each of the hyperlinks may specify that the subject field in the new email message includes an action type parameter that indicates a type of an action to be performed by the information management system 100. Types of actions that the information management system 100 may perform include updating the task information database 116 to indicate that a task has been completed or is incomplete, updating the task information database 116 with a comment related to a task, reassigning a task from the currently-assigned worker to a new worker, and/or other actions. Further, each of the hyperlinks may specify that the subject field in the new email message includes an identifier of the task recurrence that is described in the message body area 326. Further, each of the hyperlinks may specify that the new email message should be addressed to an email account used by the information management system 100.

The "Completed Task" hyperlink may include information that describes an email message that, if received by the information management system 100, will indicate to the information management system 100 that a task recurrence has successfully been completed, and that the task information database 116 should be updated accordingly. As an example, the task recurrence described in the message body area 326 may have an identifier of "ID001," and an action type parameter that indicates that the task information database 116 should be updated to reflect completion of a task may be "COMPLETED$." Further to this example, the Completed Task hyperlink may describe a new email message with a subject that includes the text "Response Task ID001 COMPLETED$."

The "Incomplete Task" hyperlink may include information that describes an email message that, if received by the information management system 100, will indicate to the information management system 100 that a task recurrence is incomplete. As an example, the task recurrence described in the message body area 326 may have an identifier of "ID001," and an action type parameter that indicates that the task information database 116 should be updated to reflect that the task is incomplete may be "INCOMPLETE$." Further to this example, the Incomplete Task hyperlink may describe a new email message with a subject that includes the text "Response Task ID001 INCOMPLETE$."

The "Comments" hyperlink may include information that describes an email message that, if received by the information management system 100, will indicate to the information management system 100 that the worker is providing a comment on a task recurrence. As an example, the task recurrence described in the message body area 326 may have an identifier of "ID001," and an action type parameter that indicates that the task information database 116 should be updated to include the comments may be "INPROGRESS$." Further to this example, the Incomplete Task hyperlink may describe a new email message with a subject that includes the text "Response Task ID001 INPROGRESS$." As will be described in further detail below, by using a "Comments" email message, a worker may provide comments to the information management system 100. Comments may include information such as whether the worker needs additional support to complete a task recurrence, whether the worker is concerned about their progress with respect to a task recurrence, and/or any other information provided by the worker.

The "Redirect Task" link may include information that describes an email message that, if received by the information management system 100, will indicate to the information management system 100 that the worker is requesting that the task or task recurrence mentioned in the message body area 326 be reassigned to a different worker. As an example, the task recurrence described in the message body area 326 may have an identifier of "ID001," and an action type parameter that indicates that the task information database 116 should be updated to reassign a task may be "REDIRECT$." Further to this example, the Redirect Task hyperlink may describe a new email message with a subject that includes the text "Response Task ID001 REDIRECT$." The Redirect Task hyperlink may also specify that the body of the new message begins with the text "New Assigned User Email Address:." As will be described in further detail below, a worker may add the email address of a worker to the body of the email message generated based on the Redirect Task hyperlink, and thereby reassign a particular task or task recurrence to a different worker.

The worker email client module 118 may receive a user input that indicates that one of the hyperlinks displayed in the message body area 326 is selected. The user input may be, for example, a mouse click, keyboard input, or any other type of input that indicates that a hyperlink is selected. Referring again to FIG. 2A, the worker email client module 118 may, in response to this user input, generate a response message as specified by the selected hyperlink (step 240). Generation of the response message may include displaying the generated response message in one or more user interface elements.

Figure 4:
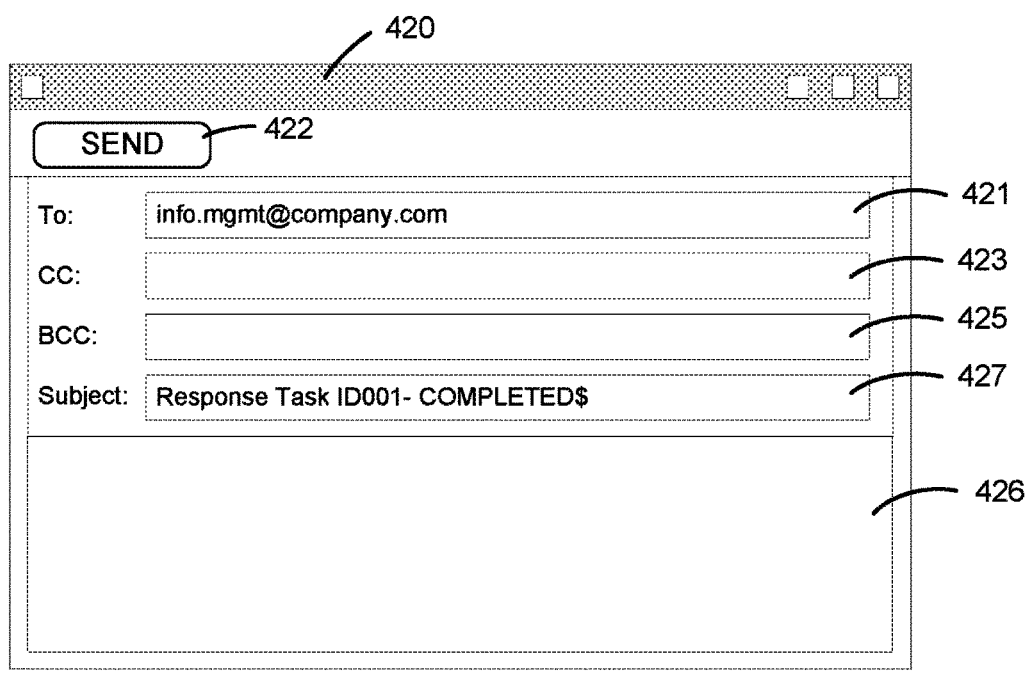
FIG. 4 shows an example message composition window that may be used to display, edit, and/or transmit an email message.

Referring now to FIG. 2A, FIG. 3, and FIG. 4, FIG. 4 shows an example message composition window 420 that may be displayed in response to a selection hyperlink from the message body area 326 of FIG. 3 (step 240). The message composition window 420 of FIG. 4 may include a Send button 422, a To area 421, a CC area 423, a BCC area 425, a Subject area 427, and a message body area 426. The Send button 422 in the message composition window 420 of FIG. 4 may be responsive to input from a user such as a mouse click, keyboard input, or any other type of input. The different areas 421, 423, 425, 426, 427 in the message composition window 420 display different portions of an email message. For example, the To area 421 includes text that indicates email addresses to which the email message is addressed, while the message body area 426 displays the contents of the body of the email message. Each or any of these different areas 421, 423, 425, 426, 427 may be editable based on user input. Changes to the contents of these areas 421, 423, 425, 427, 426 may be change the corresponding portion of the email message.

FIG. 4 shows an example wherein the Completed Task hyperlink from the message body area 326 of FIG. 3 is selected. The To area 421 indicates that the message is addressed to task.mgmt@company.com. The Subject area 427 indicates that the subject of the message is "Response Task ID001 COMPLETED$." The CC area 423, BCC area 425, and message body area 426 are blank. In an instance where a different hyperlink from the message body area 326 of FIG. 3 (e.g., the Incomplete Task hyperlink, Comments hyperlink, or Redirect Task hyperlink) is selected, the display areas 421, 423, 425, 427, 426 in the message composition window 420 may include contents specified by the selected different hyperlink.

A user may add text to the body of the email message by adding text to or changing the text in the message body area 426. As will be described in further detail below, the information management system 100 may interpret the text in the message body of an email message in different ways, based on information indicated in the subject of the email message and/or the purpose of the email message. For example, the body of the email message may be interpreted by the information management system 100 as a comment related to the completion of a task recurrence, or the information management system 100 may expect the body of the email message to include an email address of the new user to whom a task or task recurrence is being reassigned.

Referring now to both FIG. 2B and FIG. 4, the worker email client module 118 may, in response to a selection of the Send button 422, transmit the email message based on the contents of the 421, 423, 425, 426, 427 in the message composition window 420 (step 242).

The system email client module 108 and the update module 104 may then receive the email message (step 244). This may include, for example, the update module 104 periodically querying the system email client module 108 for information related to new messages received by the system email client module 108 for one or more of the email accounts used by the information management system 100. Referring again to the example described above with reference to FIG. 4, the email message may be addressed to task.mgmt@company.com. Further to this example, the update module 104 may periodically obtain new messages from the system email client module 108 that have been received for the task.mgmt@company.com email account.

The update module 104 (in conjunction with the database module 114) may then verify the contents of the received message and update the task information database 116 accordingly (step 246). This may include, for example, the update module 104 parsing the contents of the received email message to determine if the message is formatted appropriately. For example, the update module 104 may be configured to expect that a received email message may include certain contents in its subject field, related to the type and/or purpose of the message. The update module 104 may determine whether the subject field of the message contains expected text such as "COMPLETED$," "INCOMPLETE$," "INPROGRESS$," or "REDIRECT$." The update module 104 may also determine whether the email address indicated as the sender of the message corresponds to the worker assigned to the corresponding task, and/or whether a task identifier of task recurrence identifier included in the subject of the message is valid.

Alternatively or additionally, if the received message is a message for redirecting a task or task recurrence to a new worker, the update module 104 may verify that reassignment of the task or task recurrence is permitted. This may include, for example, determining whether information about the new worker is included in the task information database 116, whether the new worker is associated with the organization with which the task or task recurrence is associated, and/or whether the worker attempting to reassign the task or task recurrence is an administrator and/or has appropriate privileges to reassign the task.

If the update module 104 successfully verifies the contents of the response message, the update module 104 may communicate with the database module 114 to update the task information database 116 accordingly. For example, if the received message indicates that a task recurrence has been completed or is incomplete, the task information database 116 will be updated to reflect the complete/incomplete status of the task recurrence. If the task recurrence is complete, this may also include the task information database 116 being updated to indicate that the worker who transmitted the response message completed the task. Further, the task information database 116 may be updated to indicate that the task was completed as of the time that the response email was received. Additionally, the update module 104 may add the text in the body of the email message to the task information database 116 as a comment on the task recurrence. Alternatively, if the received message is a comments message (i.e., the subject of the email includes "INPROGRESS$"), the update module 104 will add the text in the body of the email message to the task information database as a comment on the task recurrence. Alternatively, if the received message is a reassignment message, the update module 104 will update the task information database 116 to reflect that the task or task recurrence has been reassigned to the new worker.

As described above, the update module 104 may add a comment related to a task recurrence to the task information database 116 that is based on the contents of the received email message body. When doing so, the update module 104 may determine whether the email message body contains an email signature for the worker that transmitted the email message. This may be performed by, for example, comparing the text in the email message body to an email signature for associated with the worker that is stored in the task information database 116. If the message body contains an email signature, the update module 104 may remove the signature from the message body before adding the message body as a comment into the task information database 116.

The update module 104 and/or the system email client module 108 may then generate a result message that indicates the results of the message verification and database update (step 248). This may include the update module 104 generating the contents of the result message, and communicating the contents to the system email client module 108. If the update module 104 determined that the response message could not be verified, the update module 104 may generate contents for an email message that indicate the reason why the response message could not be verified. For example, the contents may indicate that the task recurrence identifier in the response message was invalid, or that the response message was invalid for any of the other reasons described above. Alternatively, if the update module 104 and the database module 114 successfully updated the task information database 116 based on the response message, the update module 104 may generate contents for an email message that indicate that the update was successful. The generated result message may be addressed to indicate that it is being sent by one of the email accounts used by the system email client module 108.

The system email client module 108 may then transmit the generated result email message to the worker email client module 118 (step 250).

Figure 5A:
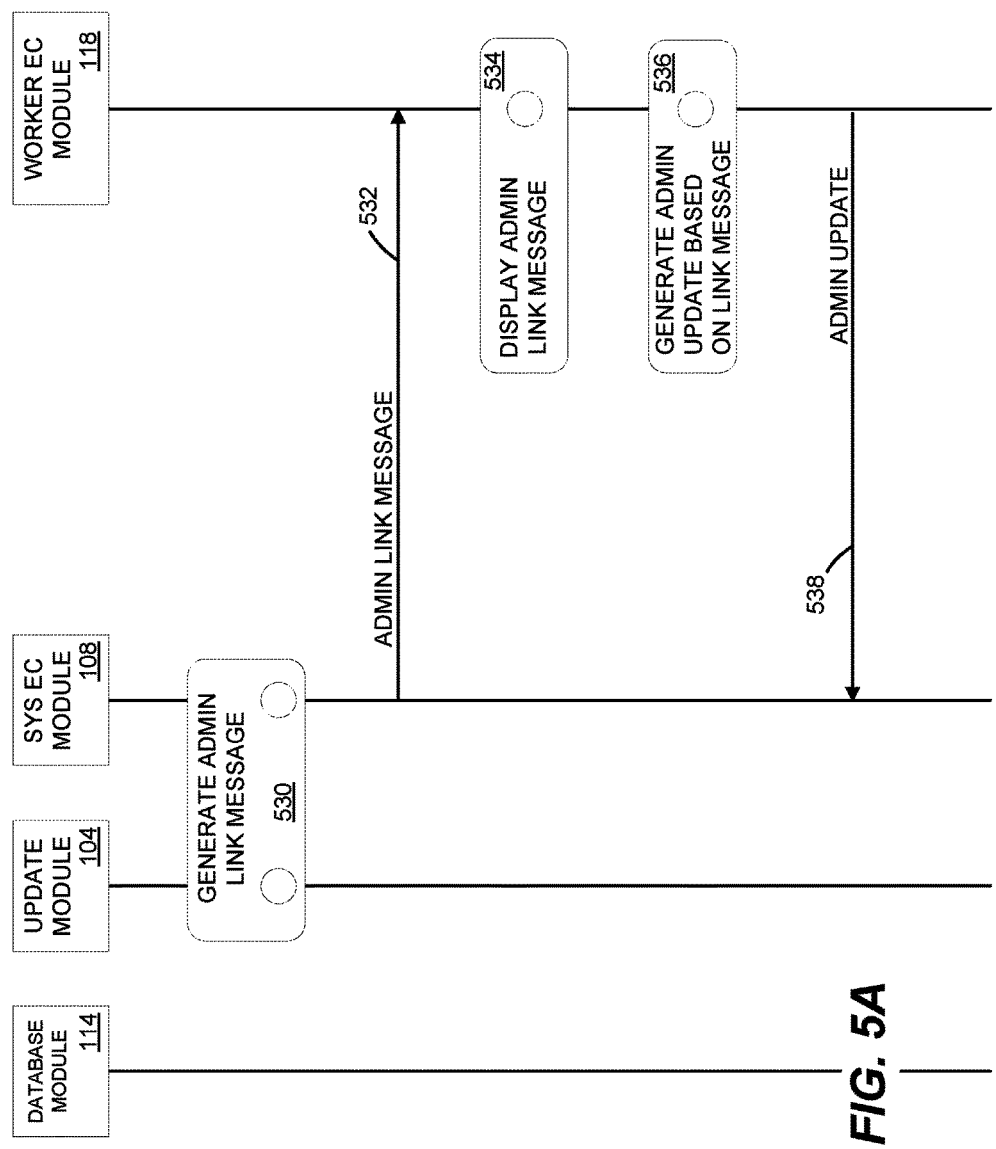
FIGS. 5A-5B show a method for updating a task information database with information related to new workers, new tasks, and/or new assignments of tasks to workers.
Figure 5B:
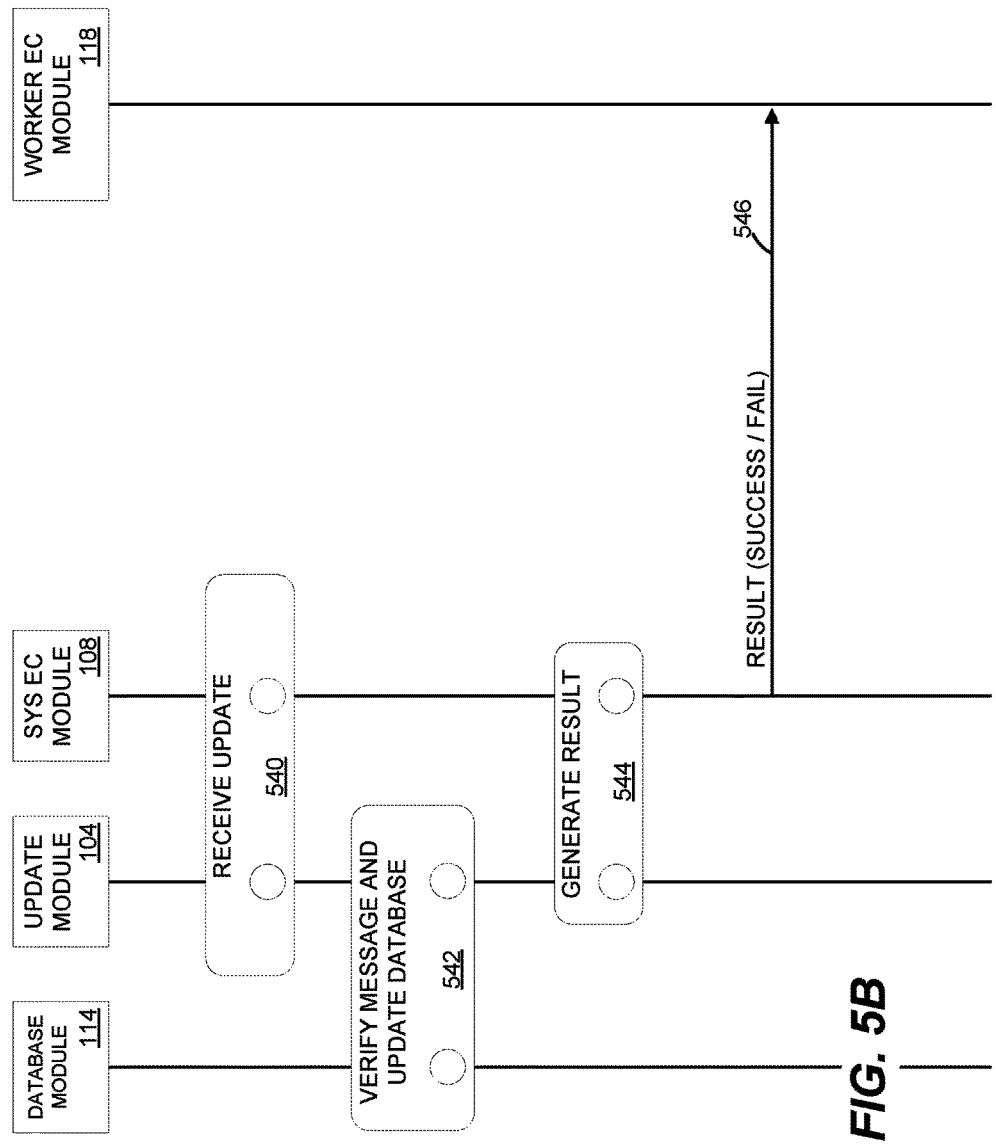

FIGS. 5A-5B show a method for updating the task information database with information related to new workers, new tasks, and/or new assignments of tasks to workers. FIGS. 5A-5B shows the database module 114, the update module 104, the system email client module 108, and the worker email client module 118.

The method of FIGS. 5A-5B may begin with the update module 104 and/or the system email client module 108 generating an administrative email message for transmission to the worker email client module 118 (step 530). The administrative email message may indicate that it is being sent by one of the email accounts used by the system email client module 108. The administrative email message may include one or more mailto hyperlinks that the worker email client module 118 may use to create a new email message. The hyperlinks may, for example, specify email messages for performing one or more administrative tasks in the information management system 100 such as adding a new user to the task information database 116, adding a new task to the task information database 116, and/or reassigning tasks in the task information database 116 to different users.

The system email client module 108 may then transmit the generated administrative email message to the worker email client module 118 (step 532). After receiving the administrative email message, the worker email client module 118 may display the received administrative email message (step 534).

Figure 6:
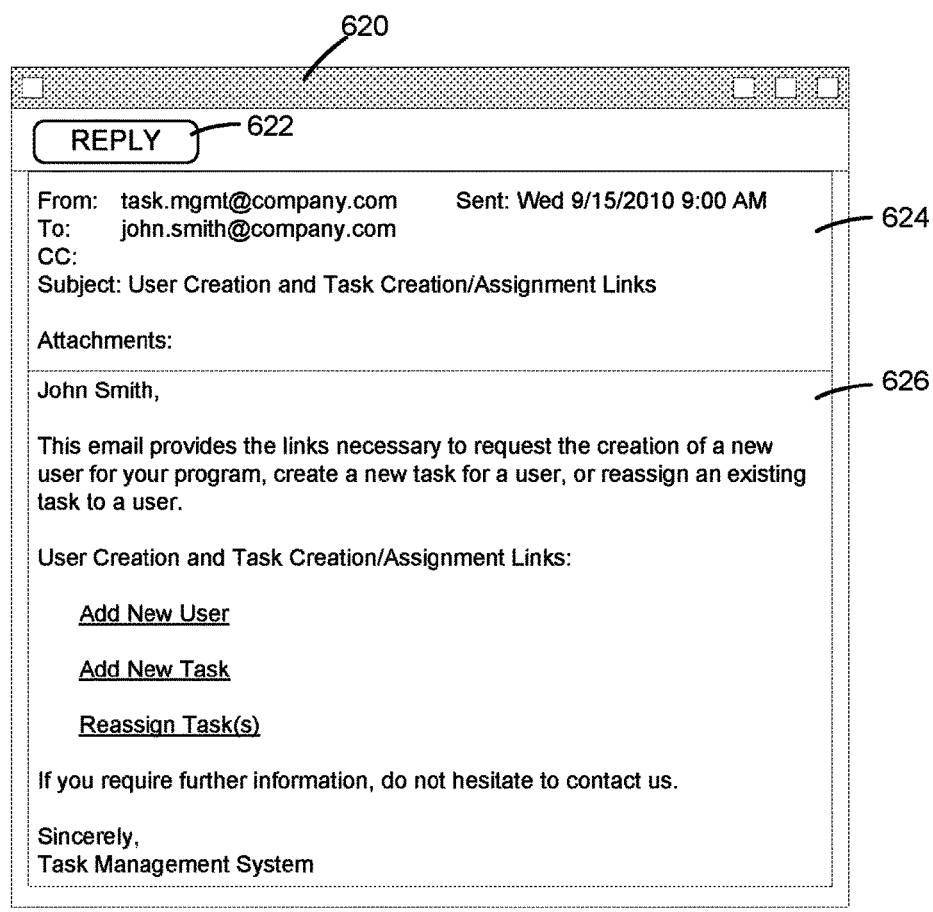
FIG. 6 shows an example email display window that may be used to display an email message.

Referring now to both FIG. 5A and FIG. 6, FIG. 6 shows an example email display window 620 that may be used by the worker email client module 118 to display the received administrative message (step 534). The email display window 620 of FIG. 6 includes a Reply button 622, a control area 624, and a message body area 626. The control area 624 may display control and/or header information associated with the administrative email message, such as the email addresses of the sender and recipient of the message. The Reply button 622 may respond to user input to generate a new display element (not depicted) to respond to the administrative email message.

The message body area 626 in the email display window 620 may display the body of the administrative email message. As an example, the message body area 626 may include one or more URIs or hyperlinks, such as the "Add New User" link, the "Add New Task" link, and/or the "Reassign Task(s)" link. These links may be defined according to the mailto URI scheme or other appropriate format, and each may describe a new email message that may be generated by the worker email client module 118 when that link is selected. Each of the hyperlinks may specify that the subject field in the new email message includes an indicator of the purpose of the hyperlink. For example, the "Add New User" hyperlink may include the action type parameter "NEWUSER$" to indicate that the message relates to the addition of a new worker to the task information database 116. Further, each of the hyperlinks may specify that the subject field in the new email message includes an identifier of the client with which the subject matter of the new email is associated. Additionally, each of the hyperlinks may specify that the new email message should be addressed to an email account used by the information management system 100.

The Add New User hyperlink may include information that describes an email message that may be used to add information for a new user to the task information database 116. As an example, the worker email client module 118 may be used by a worker that is associated with an organization that has an identifier of "ORG001," and an action type parameter that indicates that the task information database 116 should be updated to add a new user may be "NEWUSER$." Further to this example, the Add New User hyperlink may describe a new email message with a subject that includes the text "Response Client ID001 NEWUSER$." The Add New User hyperlink may also describe that the body of the new email message should include the following text:

"First Name
Last Name:
Position:
Email:
Phone 1:
Phone 2:
Fax:."

The Add New Task hyperlink may include information that describes an email message that may be used to add a new task to the task information database 116. As an example, the worker email client module 118 may be used by a worker that is associated with an organization that has an identifier of "ORG001," and an action type parameter that indicates that the task information database 116 should be updated to add a new task may be "TASK$." Further to this example, the Add New Task hyperlink may describe a new email message with a subject that includes the text "Response Client ID001 TASK$." The Add New User hyperlink may also describe that the body of the new email message should include the following text:

"Task Name:
Task Due Date:
Alert Date One:
Alert Date Two:
Alert Date Three:
Assigned User Email Address:."

The Reassign Task(s) hyperlink may include information that describes an email message that may be used to reassign one or more tasks from one worker to another worker. As an example, the worker email client module 118 may be used by a worker that is associated with an organization that has an identifier of "ORG001," and an action type parameter that indicates that the task information database 116 should be updated to reassign tasks may be "ASSIGN$." Further to this example, the Reassign Task(s) hyperlink may describe a new email message with a subject that includes the text "Response Client ID001 ASSIGN$." The Reassign Task(s) hyperlink may also describe that the body of the new email message should include the following text:

"Task Name:
Older User Email:
New User Email:."

The worker email client module 118 may receive a user input that indicates that one of the hyperlinks displayed in the message body area 626 of the email display window 620 is selected. The user input may be, for example, a mouse click, keyboard input, or any other type of input that indicates that a hyperlink is selected. Referring again to FIG. 5A, the worker email client module 118 may, in response to this user input, generate an administrative update message as specified by the selected hyperlink (step 536). The worker email client module 118 may display the generated administrative update message via a display device (not depicted) in a message composition window (not depicted) with similar characteristics to the message composition window 420 of FIG. 4. A user may modify the generated administrative update message using the message composition window 420. This may include adding text to the body of the administrative update message and/or changing the text of the body of the administrative update message. For example, to specify a new user to be added to the task information database 116, the user may add additional text to the body of the administrative update message related to the new user, such as a first name, last name, position, email address, one or more phone numbers, and/or a fax number. As an example, the user may modify the body of the administrative update message to add a new user named "James Smith," such that body of the administrative update message includes the following text:

"First Name: James
Last Name: Smith
Position: Worker
Email: james.smith@company.com
Phone 1: 100-100-1000
Phone 2: 100-100-1001
Fax:. 100-100-1002."

To specify a new task that should be added to the task information database 116, the user may add additional text to the body of the administrative update message such as a task name, task due date, alert dates, and/or an email address of the assigned worker. To specify the reassignment of a task, the user may add additional text to the body of the administrative update message, such as a task name, the email address of the currently assigned user, and the email address of the user to whom the task should be reassigned.

The worker email client module 118 may then transmit the administrative update message to the system email client module 108 (step 538).

Referring now to FIG. 5B, the system email client module 108 and the update module 104 may then receive the administrative update email message (step 540). This may include, for example, the update module 104 periodically querying the system email client module 108 for information related to new messages received by the system email client module 108 for one or more of the email accounts used by the information management system 100.

The update module 104 (in conjunction with the database module 114) may then verify the contents of the received administrative update message and update the task information database 116 accordingly (step 542). This may include, for example, the update module 104 parsing the contents of the received administrative update email message to determine if the message is formatted appropriately. For example, the update module 104 may be configured to expect that a received email message may include certain contents in its subject field, related to the type and/or purpose of the message. For example, the update module 104 may determine whether the subject field of the message contains expected text such as "NEWUSER$," "TASK$," or "ASSIGN$." The update module 104 may also determine whether the message body contains expected text related to the type and/or purpose of the message. If the subject of the message contains "NEWUSER$," the update module 104 may parse the body of the message to determine whether it includes information related to a new user such as a first name, last name, position, email address, one or more phone numbers, and/or a fax number. If the subject of the message contains the text "TASK$," the update module 104 may parse the body of the message to determine whether it includes information related to a new task such as the task name, a task due date, alert dates, and/or an email address of a worker assigned to the task. If the subject of the message contains "ASSIGN$," the update module 104 may parse the body of the message to determine whether it includes information related to a reassignment of a task, such as a task name, the email address of the currently assigned user, and the email address of the user to whom the task should be reassigned.

The update module 104 may also determine whether the worker who transmitted the administrative update message is associated with the client identified in the subject of the message. Further, the update module 104 may determine whether the worker who transmitted the administrative update message is an administrative user and/or has the privileges required to perform the requested update. Alternatively or additionally, if the received administrative update message is a message for redirecting one or more tasks to a new worker, the update module 104 may verify that reassignment of the task is permitted. This may include, for example, determining whether information about the new worker is included in the task information database 116, and/or whether the new worker is associated with the organization with which the tasks are associated.

If the update module 104 successfully verifies the contents of the administrative update message, the update module 104 may communicate with the database module 114 to update the task information database 116 as specified in the administrative update message. In an instance where the administrative update message related to the reassignment of a task (i.e., if the subject of the message contains "ASSIGN$,"), a special identifier for task name may be used to reassign all of the tasks currently associated with a user to a new user. As an example, if the message includes the text "ALL" as an indicator of the task name, the update module 104 will update the task information database 116 to reflect that all of the tasks associated with the currently-assigned worker are being reassigned to the new worker.

The update module 104 and/or the system email client module 108 may then generate a result message that indicates the results of the message verification and database update (step 544). This may include the update module 104 generating the contents of the result message, and communicating the contents to the system email client module 108. If the update module 104 determined that the administrative update message could not be verified, the update module 104 may generate contents for an email message that indicate the reason why the administrative update message could not be verified. Alternatively, if the update module 104 and the database module 114 successfully updated the task information database 116 based on the administrative update message, the update module 104 may generate contents for an email message that indicate that the update was successful. The generated result message may be addressed to indicate that it is being sent by one of the email accounts used by the system email client module 108.

The system email client module 108 may then transmit the generated result email message to the worker email client module 118 (step 546).

Figure 7A:
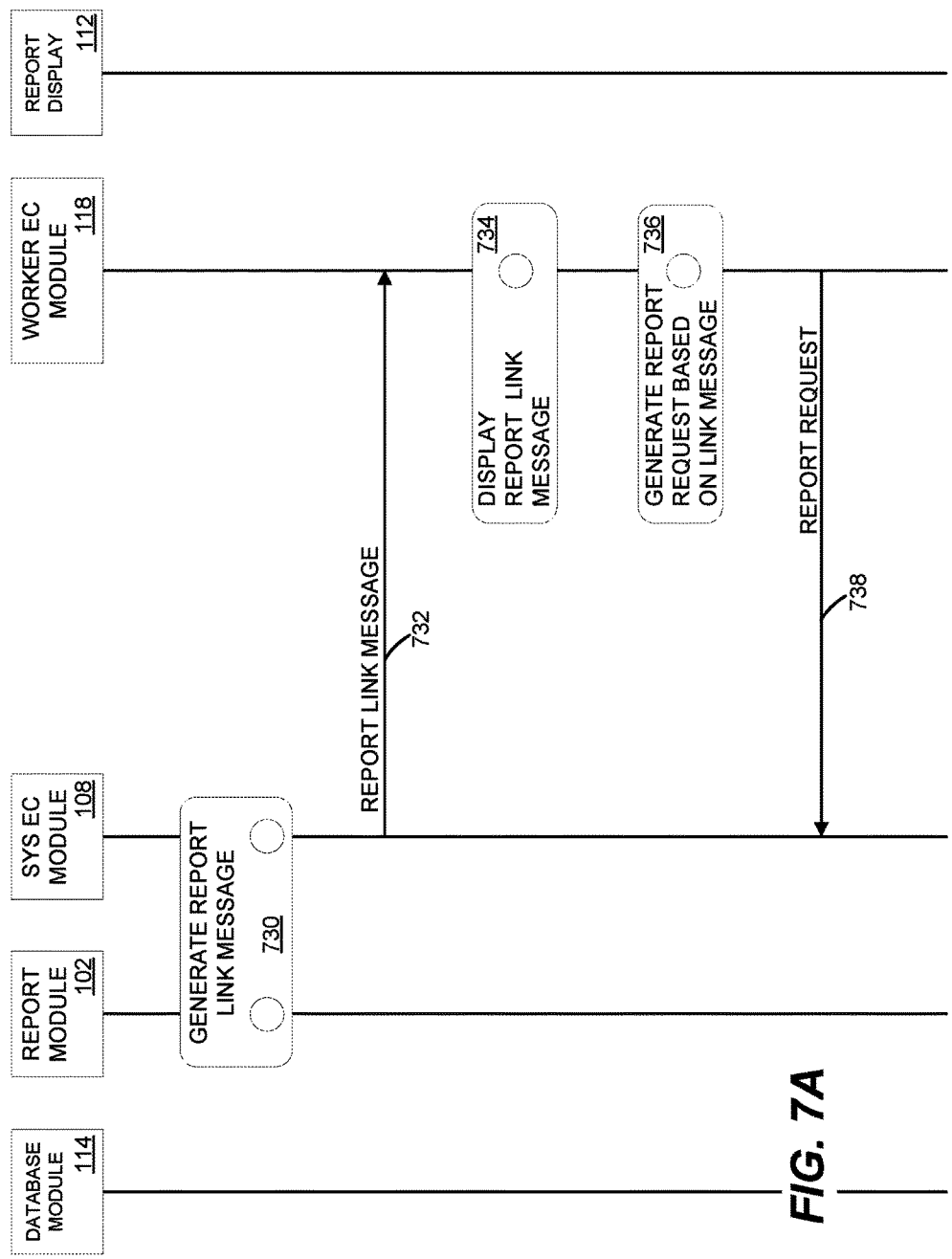
FIGS. 7A-7B show a first method for the generation and transmission of a report that describe the status of task completion.
Figure 7B:
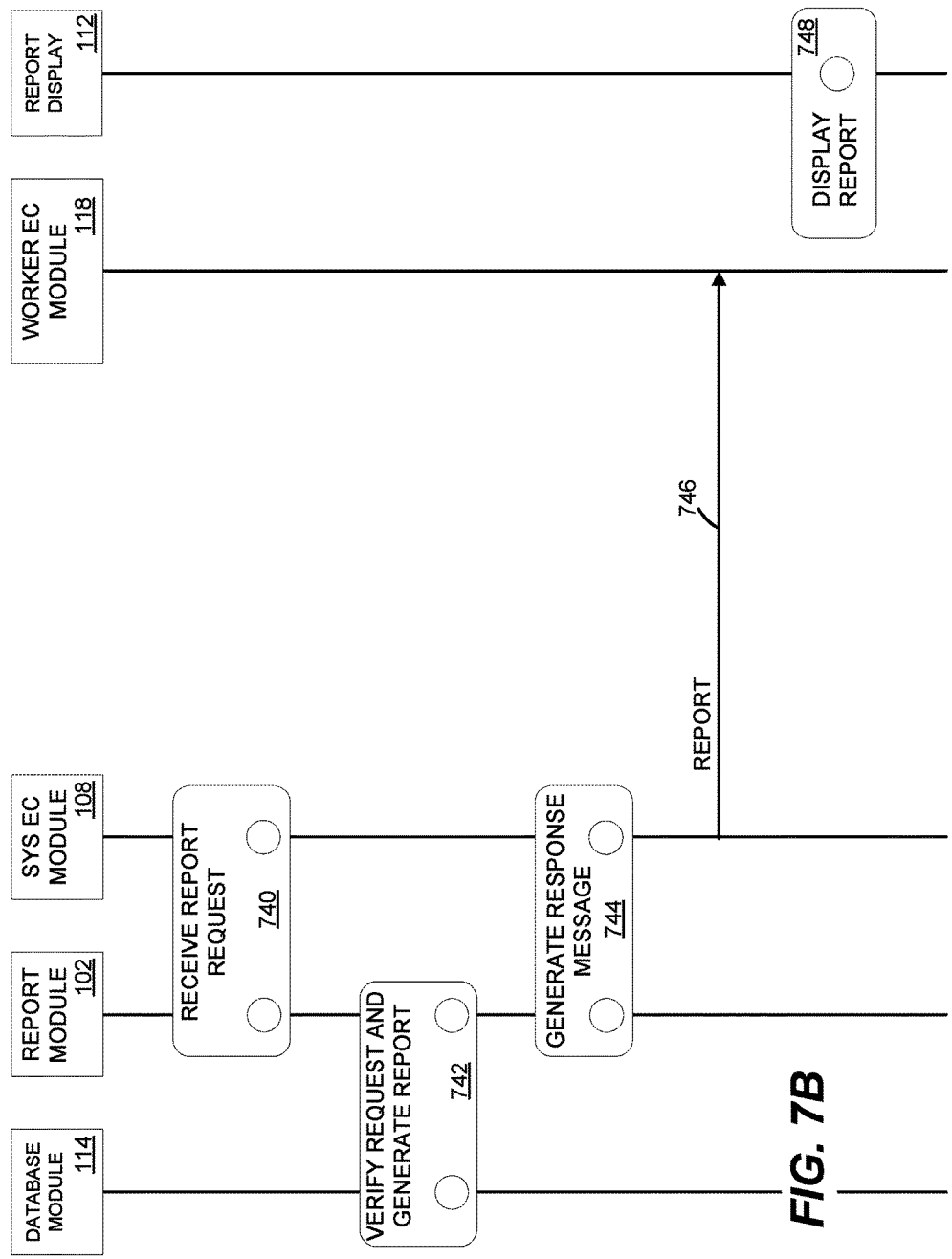

FIGS. 7A-7B show a first method for the generation and transmission of a report that describe the status of task completion. FIGS. 7A-7B shows the database module 114, the report module 102, the system email client module 108, the report display module 112, and the worker email client module 118.

The method of FIGS. 7A-7B may begin with the report module 102 and/or the system email client module 108 generating report link email message for transmission to the worker email client module 118 (step 730). The report link email message may indicate that it is being sent by one of the email accounts used by the system email client module 108. The report link email message may include one or more mailto hyperlinks that the worker email client module 118 may use to create a new email message. The contents of the hyperlinks may be generated by the report module 102 to include information that is specific to the worker to which the email message is addressed. For example, a hyperlink may specify a request for a report related to tasks that are associated with the organization with which the worker is associated.

The system email client module 108 may then transmit the generated report link email message to the worker email client module 118 (step 730). After receiving the report link email message, the worker email client module 118 may display the received report link email message (step 732).

Figure 8:
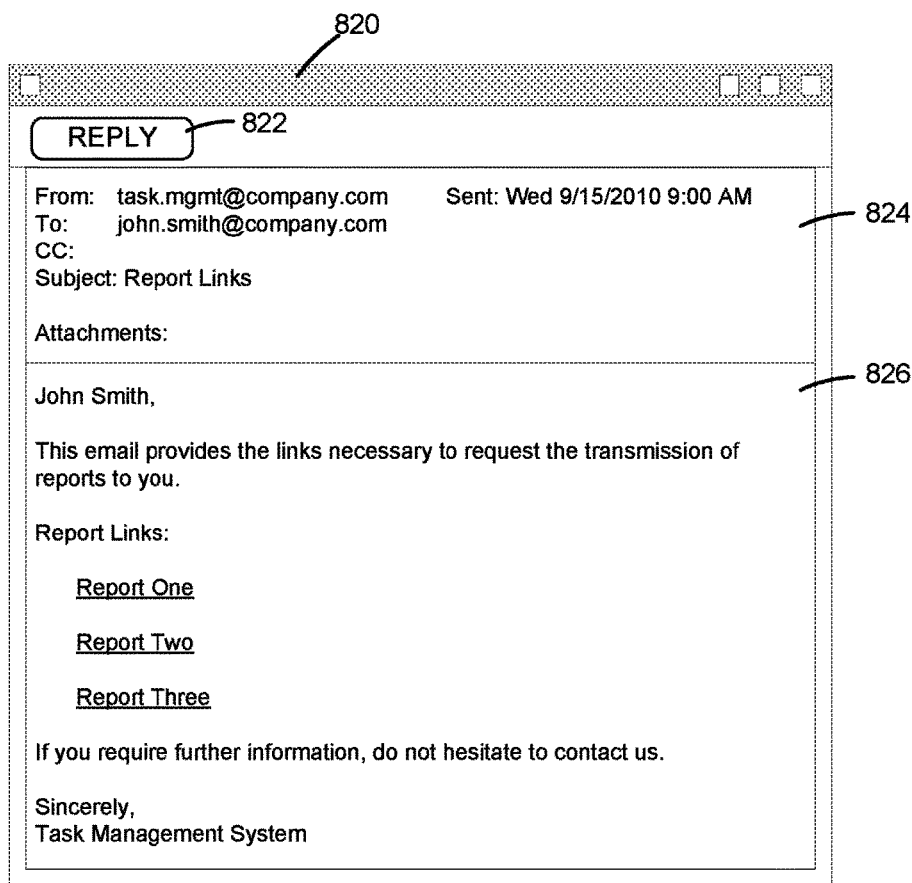
FIG. 8 shows an example email display window that may be used to display an email message.

Referring now to both FIG. 7A and FIG. 8, FIG. 8 shows an example email display window 820 that may be used by the worker email client module 118 to display the received report link message (step 734). The email display window 820 of FIG. 8 includes a Reply button 822, a control area 824, and a message body area 826. The control area 824 may display control and/or header information associated with the report link email message, such as the email addresses of the sender and recipient of the message. The Reply button 822 may respond to user input to generate a new display element (not depicted) to respond to the report link email message.

The message body area 826 in the email display window 820 may display the body of the report link email message. As an example, the message body area 826 may include one or more URIs or hyperlinks, such as the "Report One" link, the "Report Two" link, and/or the "Report Three" link. These links may be defined according to the mailto URI scheme or other appropriate format, and each may describe a new email message that may be generated by the worker email client module 118 when that link is selected. Each of the hyperlinks may specify that the subject field in the new email message includes an indicator of the purpose of the hyperlink. For example, the "Report One" hyperlink may include the action type parameter "REPORT$" to indicate that the message indicates a request for the information management system 100 to generate and transmit a report. Further, each of the hyperlinks may specify that the subject field in the new email message includes an identifier of the client with which the subject matter of the new email is associated. Additionally, each of the hyperlinks may specify that the new email message should be addressed to an email account used by the information management system 100.

The Report One hyperlink may include information that describes an email message that may be used to request a report. As an example, the worker email client module 118 may be used by a worker that is associated with an organization that has an identifier of "ORG001." Further to this example, the Report One hyperlink may describe a new email message with a subject that includes the text "Response Client ID001 REPORT$." The Report One hyperlink may also specify that the new email message should include text in the body of the message that describes the report being requested. As an example, the Report One hyperlink may indicate that the body of the message includes the text "TaskSummaryReport." The body of the message may indicate what type of report is being requested, and/or may indicate parameters (e.g., a time range, a particular task or group of tasks, a particular worker or group of workers) on which the requested report should be focused.

The Report Two and Report Three hyperlinks may specify email messages that are similar to the message specified by the Report One hyperlink, though they may specify different parameters for the bodies of their respective messages. As an example, the Report Two hyperlink may specify a report for tasks that have been performed for a first time period (such as the past month), while the Report Three hyperlink may specify a report for tasks that have been performed for a second time period (such as the past six months).

The worker email client module 118 may receive a user input that indicates that one of the hyperlinks displayed in the message body area 826 of the email display window 820 is selected. The user input may be, for example, a mouse click, keyboard input, or any other type of input that indicates that a hyperlink is selected. Referring again to FIG. 7A, the worker email client module 118 may, in response to this user input, generate a report request email message as specified by the selected hyperlink (step 736). The worker email client module 118 may display the generated report request message via a display device (not depicted) in a message composition window (not depicted) with similar characteristics to the message composition window 420 of FIG. 4. A user may modify the generated report request message using the message composition window. This may include adding text to the body of the report request message and/or changing the text of the body of the report request message.

The worker email client module 118 may then transmit the report request message to the system email client module 108 (step 738).

Referring now to FIG. 7B, the system email client module 108 and the report module 102 may then receive the report request message (step 740). This may include, for example, the report module 102 periodically querying the system email client module 108 for information related to new messages received by the system email client module 108 for one or more of the email accounts used by the information management system 100.

The report module 102 (in conjunction with the database module 114) may then verify the contents of the received report request message and, if the received report request is acceptable, generate the requested report (step 742). Verifying the report request may include the report module 102 determining whether the worker who transmitted the report request message is associated with the client identified in the subject of the message. Further, the report module 102 may determine whether the worker who transmitted the report request message is an administrative user and/or has the privileges required to receive the requested report.

Verifying the report request message may also include the report module 102 determining whether the message is formatted correctly. For example, the report module 102 may be configured to determine whether the subject field of the message contains text such as "REPORT$," and/or whether the body of the email includes appropriate parameters for defining the scope of a report.

If the report module 102 successfully verifies the contents of the report request message, the report module 102 may obtain data from the task information database 116 (via the database module 114) and generate a report as specified in the report request message. The report may be one or more electronic files. The one or more electronic files may be defined according to formats such as but not limited to Portable Document Format (PDF), Tagged Image File Format (TIFF), and/or any other appropriate format.

The report module 102 and/or the system email client module 108 may then generate a report email message for transmission to the worker email client module 118 (step 744). This may include the report module 102 communicating the contents of the report message to the system email client module 108. The generated report message may be addressed to indicate that it is being sent by one of the email accounts used by the system email client module 108, and the generated report message may include the one or more report documents as attachments. The system email client module 108 may then transmit the report email message to the worker email client module 118 (step 746). The report display module 112 may then display the report (step 748) on a display device (not depicted).

Figure 9:
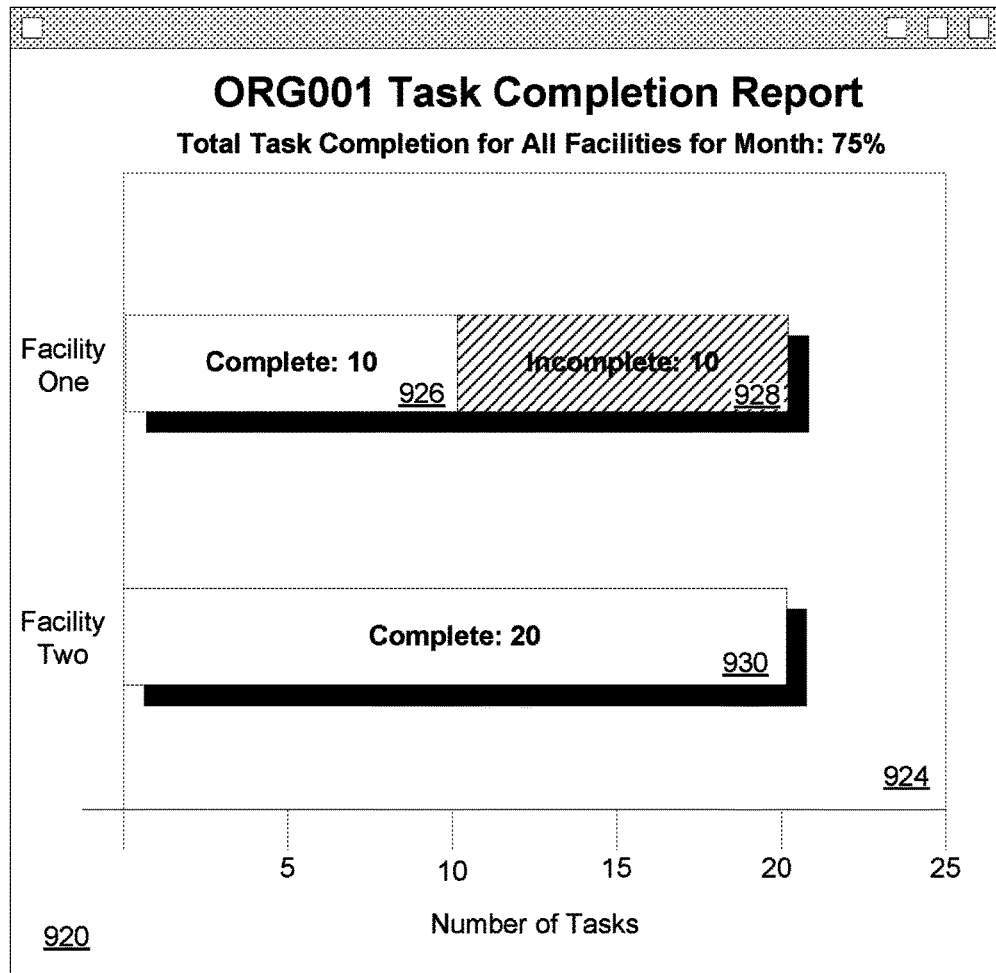
FIG. 9 shows a first example page of a report that may be generated by an information management system.

Referring now to both FIG. 7B and FIG. 9, FIG. 9 shows a first example page 920 of a report that may be displayed by the report display module 112 (step 748). The first example page 920 shows report data that relates to tasks assigned to workers in an organization with ID "ORG001" for a given month. ORG001, according to this example, has two facilities, named "Facility One" and "Facility Two." The first example page 920 includes a report area 922, which includes a bar graph 924. The bar graph 924 includes a Facility Two complete area 930, which indicates the total number of task recurrences that have been completed at Facility Two in the month. The bar graph 924 also includes a Facility One complete area 926 and a Facility One incomplete area 928, which indicate the total number of task recurrences that have been completed and which still remain incomplete, respectively, at Facility One.

Figure 10:
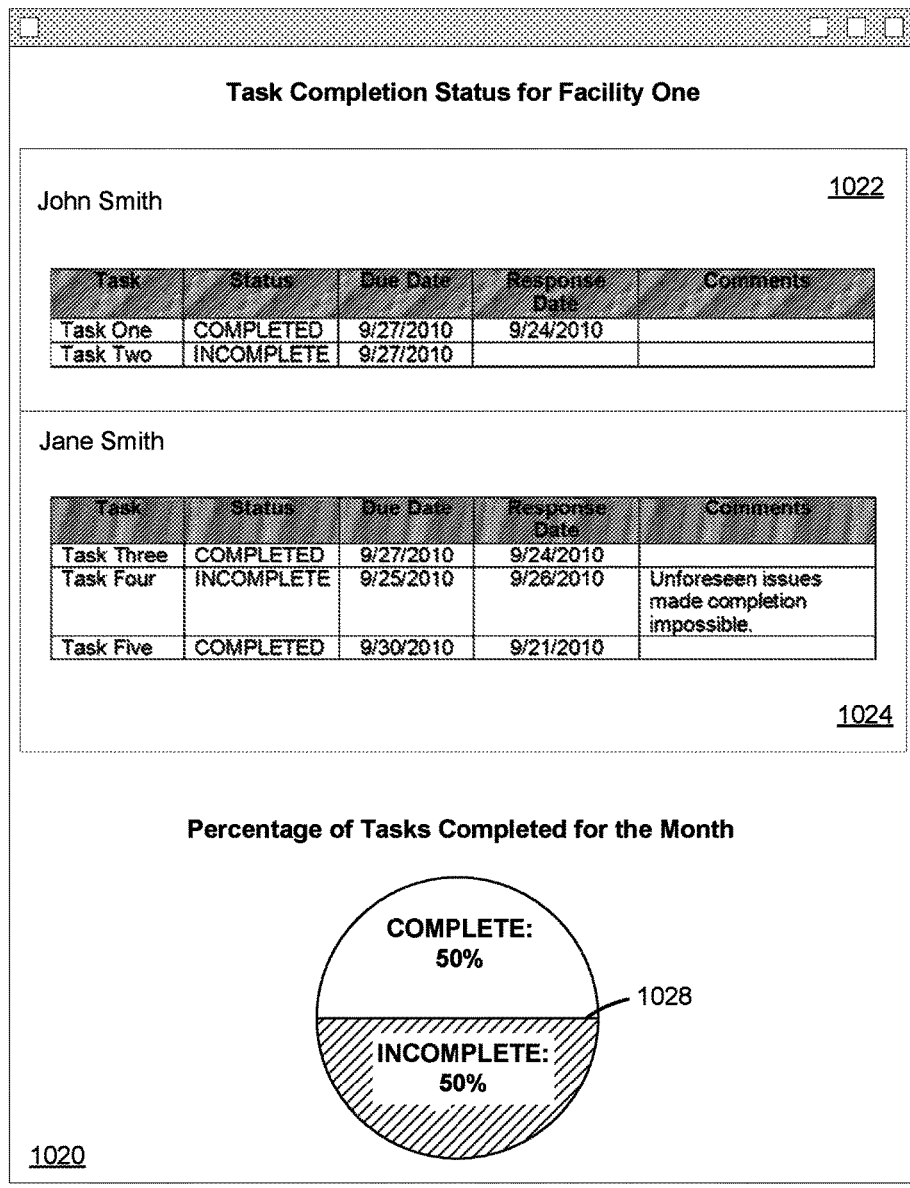
FIG. 10 shows a second example page of a report that may be generated by an information management system.

Referring now to both FIG. 7B and FIG. 10, FIG. 10 shows a second example page 1020 of a report that may be displayed by the report display module 112 (step 748). The second example page 1020 continues with the example from the first example page 920 of FIG. 9, and shows data related to the completion of tasks at Facility One. The second example page 1020 includes a pie chart 1028 that indicates the percentage of completed versus incomplete task recurrences for the month. The second example page 1020 also includes a first worker-specific task area 1022, which indicates the status of tasks that are assigned to a first user (John Smith) and are expected to be completed within the month. The second example page 1020 also includes a second worker-specific task area 1024, which indicates the status of tasks that are assigned to a second user (Jane smith) and are expected to be completed within the month. As an alternative to the organization of tasks shown in the worker-specific task areas 1022, 1024, tasks may be organized in the worker-specific task areas 1022, 1024 according to recurrence intervals. For example, information related to non-recurring tasks may be included above tasks which recur on a weekly basis, which may be included above tasks which recur on a monthly basis, and so on.

The example pages 920, 1020 described above with reference to FIG. 9 and FIG. 10 are provided by way of example. Alternatively or additionally, the reports generated by the report module 102 may include any combination of information described above as stored in the task information database 116.

Figure 11:
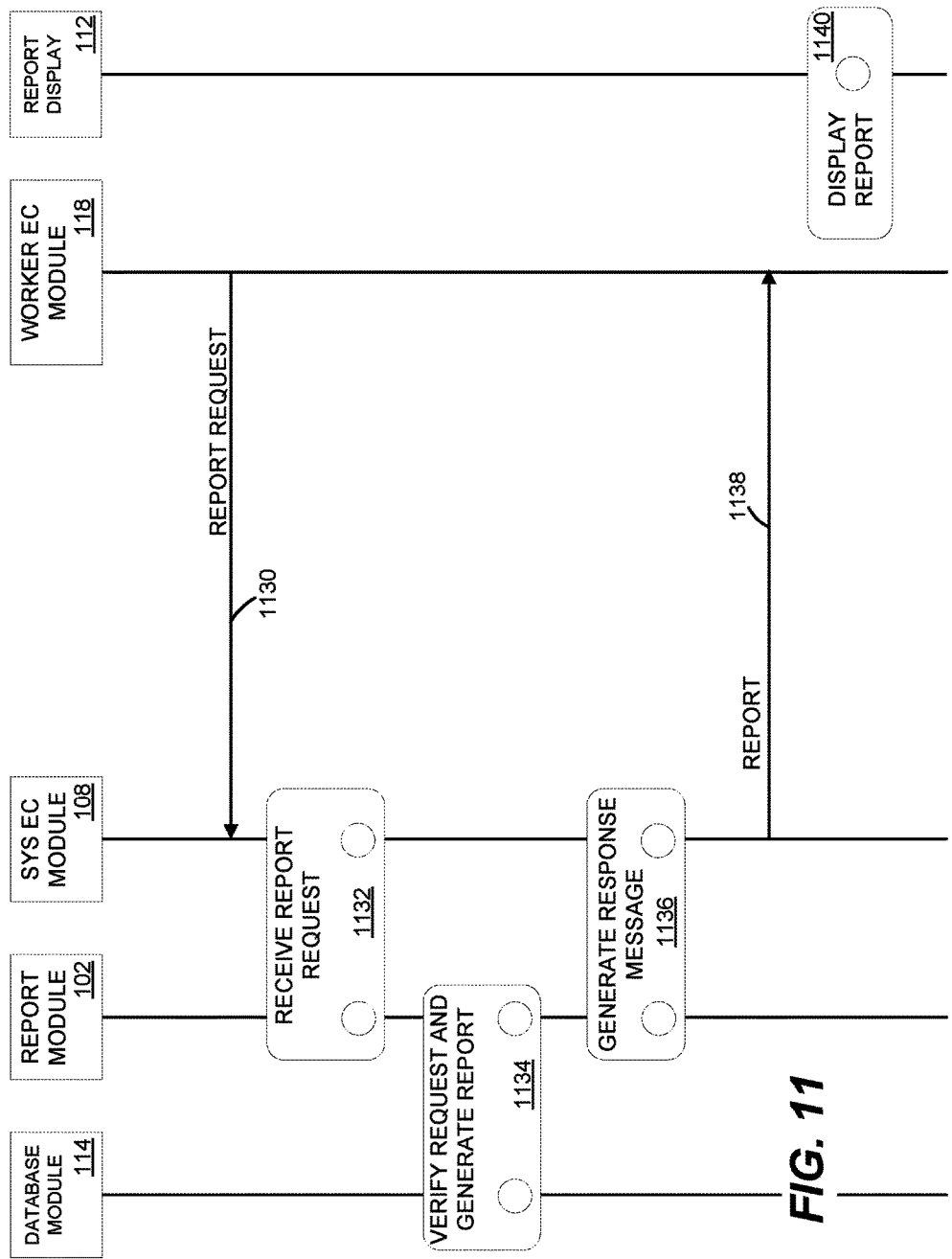
FIG. 11 shows a second method for the generation and transmission of a report that describe the status of task completion.

FIG. 11 shows a second method for the generation and transmission of a report that describe the status of task completion. FIG. 11 shows the database module 114, the report module 102, the system email client module 108, the report display module 112, and the worker email client module 118.

The method of FIG. 11 may begin with the worker email client module 118 transmitting a report request email message to the system email client module 108 (step 1130). The system email client module 108 and the report module 102 may then receive the report request message (step 1132). This may include, for example, the report module 102 periodically querying the system email client module 108 for information related to new messages received by the system email client module 108 for one or more of the email accounts used by the information management system 100.

The report module 102 (in conjunction with the database module 114) may then verify the contents of the received report request message and, if the received report request is acceptable, generate a report (step 1134). Verifying the report request may include the report module 102 determining whether the address from which the report request email was sent is a valid email address, as stored in the task information database 116. The report module 102 may also determine, based on the email address, whether the worker associated with the email address is an administrative user and/or has the privileges required to receive a report.

If the report module 102 successfully verifies the contents of the report request message, the report module 102 may obtain data from the task information database 116 (via the database module 114) and generate a report. Based on the email address from which the request message was sent, the report module 102 may determine which organization the worker is associated with, and may generate a default report that is configured for the worker's organization. The default report may include information for all of or some subset of the facilities associated with the organization, and/or the default report may be focused on some subset of workers associated with the organization, and/or the default report may be focused on a configured time period such as the current month, last six months, or other time period. Alternatively or additionally, the report module 102 may be configured to generate a different default for different workers within an organization. The report module 102 may, for example, determine which worker requested the report based on the email address from which the report request was sent, and generate a default report that is configured as a default report for that specific worker. The generated report may be one or more electronic files, and may possess any characteristic or combination of characteristics of the reports described above as generated by the report module 102 with respect to FIGS. 7A-7B, FIG. 8, FIG. 9, and/or FIG. 10.

The report module 102 and/or the system email client module 108 may then generate a report email message for transmission to the worker email client module 118 (step 1136). This may include the report module 102 communicating the contents of the report message to the system email client module 108. The generated report message may be addressed to indicate that it is being sent by one of the email accounts used by the system email client module 108, and the generated report message may include the one or more report documents as attachments. The system email client module 108 may then transmit the report email message to the worker email client module 118 (step 1138). The report display module 112 may then display the report (step 1140) on a display device (not depicted). The report display module 112 may display the report in fashion identical or similar to the display of the report described above with reference to FIG. 9 and FIG. 10.

Figure 12:
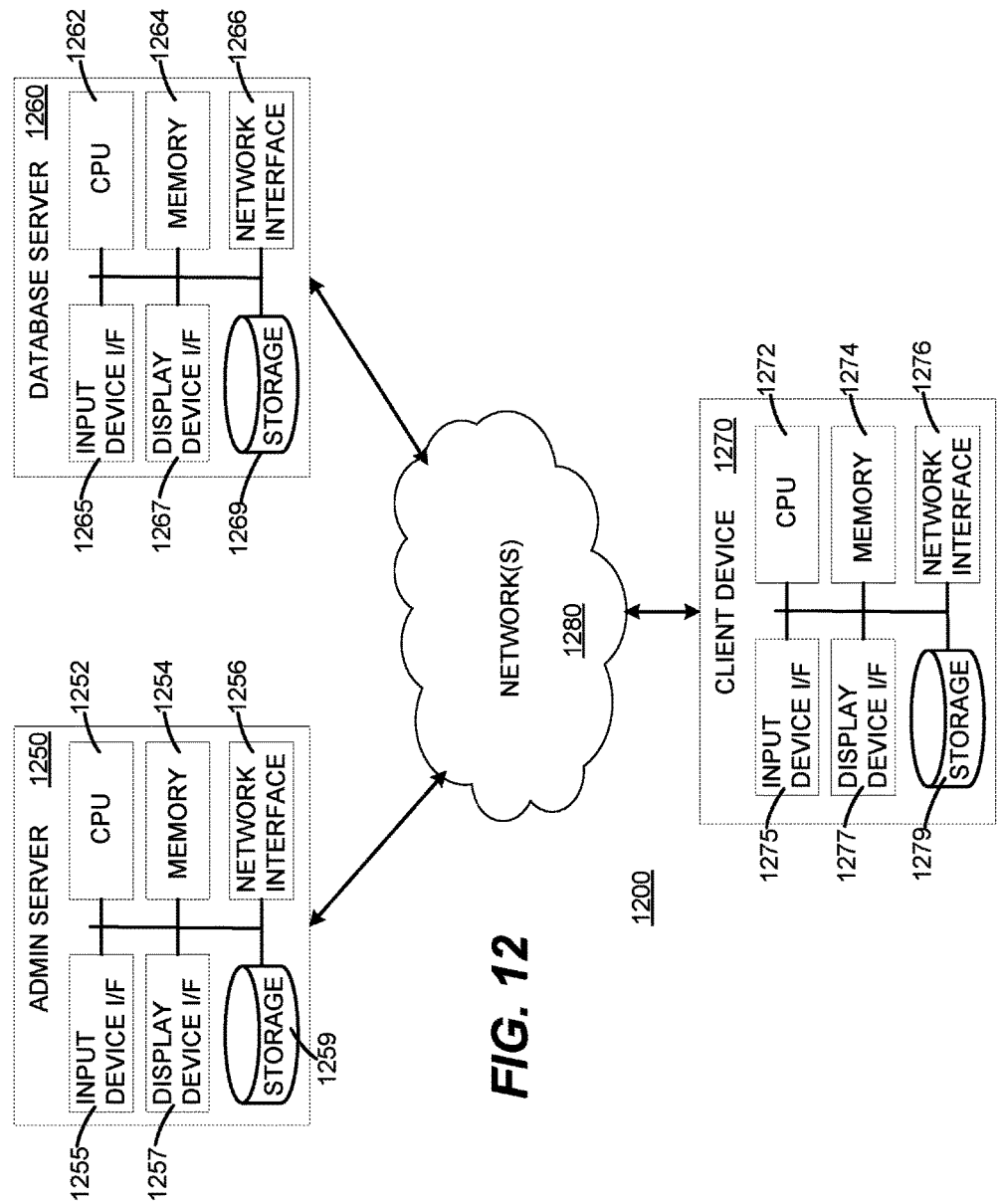
FIG. 12 shows an example system that may be used to implement the architecture of FIG. 1.

FIG. 12 shows an example system 1200 that may be used to implement the architecture 120 of FIG. 1. The example system 120 includes an administrative server 1250, a database server 1260, a client device 1270, and one or more networks 1280.

The administrative server 1250 may include a processor 1252, memory device 1254, communication interface 1256, input device interface 1255, display device interface 1257, and storage device 1259. The database server 1260 may include a processor 1262, memory device 1264, communication interface 1266, input device interface 1265, display device interface 1267, and storage device 1269. The client device 1270 may include a processor 1272, memory device 1274, communication interface 1276, input device interface 1275, display device interface 1277, and storage device 1279.

The administrative server 1250 may be configured to perform any feature or combination of features described above with reference to FIGS. 1-11 as performed by the report module 102, update module 104, alert module 106, system email client module 108, and/or database module 124. The storage device 1269 in the database server 1260 may store the task information database 116 or a portion thereof. The database server 1260 may be configured to perform any feature or combination of features described above with reference to FIGS. 1-10 related to the storage of data in the task information database 116. The client device 1270 may be configured to perform any feature or combination of features described above with reference to FIGS. 1-11 as performed by the worker email client module 128 and/or the report display module 122. The client device 1270 may be, for example, a desktop computer, a laptop computer, a netbook, a tablet computer, a personal digital assistant (PDA), a cellular phone, or any other appropriate device.

Each or any of the memory devices 1254, 1264, 1274 may be or include a device such as a Dynamic Random Access Memory (D-RAM), Static RAM (S-RAM), or other RAM or a flash memory. Each or any of the storage devices 1259, 1269, 1279 may be or include a hard disk, a magneto-optical medium, an optical medium such as a CD-ROM, a digital versatile disk (DVDs), or Blu-Ray disc (BD), or other type of device for electronic data storage.

Each or any of the communication interfaces 1256, 1266, 1276 may be, for example, a communications port, a wired transceiver, or a wireless transceiver. Each or any of the network interfaces 1256, 1266, 1276 may be capable of communicating using technologies such as Ethernet, fiber optics, microwave, xDSL (Digital Subscriber Line), Wireless Local Area Network (WLAN) technology, wireless cellular technology, and/or any other appropriate technology. The communication interfaces 156, 166, 1276 may be used by the administrative server 1250, database server 160, and/or client device 1270 to communicate via the one or more networks 1280. The communication interfaces 156, 166, 1276 may be used by the administrative server 1250, database server 160, and/or client device 1270 to communicate any message or combination of messages described above with reference to FIGS. 1-11 as communicated by the system email client module 108, worker email client module 118, and/or database module 114. The one or more networks 1280 may include one or more private networks and/or one or more public networks such as the Internet. The one or more networks 1280 may be based on wired and/or wireless networking technologies.

Each or any of the input device interfaces 1255, 1265, 1275 may an interface configured to receive input from an input device such as a keyboard, a mouse, a trackball, a scanner, a touch screen, a touch pad, a stylus pad, and/or other device. Each or any of the input device interfaces 1255, 1265, 1275 may operate using a technology such as Universal Serial Bus (USB), PS/2, Bluetooth, infrared, and/or other appropriate technology.

Each or any of the display device interfaces 1257, 1267, 1277 may be an interface configured to communicate data to a display device. Each or any of the display device interfaces 1257, 1267, 1277 may operate using technology such as Video Graphics Array (VGA), Super VGA (S-VGA), Digital Visual Interface (DVI), High-Definition Multimedia Interface (HDMI), or other appropriate technology.

The memory 1254 of the administrative computer 1250 may store instructions which, when executed by the processor 1252, cause the processor 1252 to perform any feature or combination of features described above with reference to FIGS. 1-11 as performed by the report module 102, update module 104, alert module 106, system email client module 108, and/or database module 124. The memory 1264 of the database server 1260 may store instructions which, when executed by the processor 1262, cause the processor 1262 to perform any feature or combination of features described above with reference to FIGS. 1-11 as related to the storage of data in the task information database 116. These features may include, for example, executing instructions related to a database management system, storing and/or modifying data in the task information database 116, and/or obtaining data from the task information database 116. The memory 1274 of the client device 1270 may store instructions which, when executed by the processor 1272, cause the processor 1272 to perform any feature or combination of features described above with reference to FIGS. 1-11 as performed by the worker email client module 128 and/or the report display module 122.

The client device 1270 may include or be connected to a display device (not depicted) via the display device interface 1277. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received from the input device interface 1275, any graphical elements described above with reference to FIGS. 1-11 as displayed by the worker email client module 128 and/or the report display module 122.

As described above with reference to FIGS. 1-12, the information management system 100 may be configured to use one or more email accounts that are associated with the information management system 100 for the transmission and reception of email communications. In various configurations, different email addresses may be used by the information management system 100 for different purposes. For example, the update module 104 may be configured to use a first email address for the transmission/reception of messages, while the report module 104 may be configured to use a second email address for the transmission/reception of messages. Alternatively, the report module 102 and/or update module 104 may be configured to use a first email address to transmit/receive email messages for performance of the methods of FIGS. 2A-2B, FIGS. 5A-5B, and FIGS. 7A-7B, while the report module 102 may be configured to use a second email address to transmit/receive email messages for performance of the method of FIG. 11. Alternatively or additionally, the report module 102, update module 104, and/or alert module 106 may be configured to use different email addresses for communicating email messages to different organizations.

While examples are provided above with respect to FIGS. 1-12 which includes the use of email communications, the functionality of the information management system 100 and/or the worker email client module 126 may also be implemented using different types of communications technology. For example, the features described above with reference to FIGS. 1-12 may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

When referred to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with the other features and elements. For example, each feature or element as described above with reference to 1-12 may be used alone without the other features and elements or in various combinations with or without other features and elements. Sub-elements of the methods and features described above with reference to FIG.

1-12 may be performed in any arbitrary order (including concurrently), in any combination or sub-combination.

What is claimed is:

1. A secure method for updating an information management system without requiring a user login, the method comprising:
    storing data in a database that describes a plurality of individuals including an email address and one or more tasks that are associated with each of the individuals;
    receiving a first email message from a particular individual that includes an action type parameter that indicates a request for information;
    determining whether to respond to the request for information based on the action type parameter and an email address of the particular individual; and
    in response to a determination to respond to the request for information;
    automatically generating completion information based on the first email that indicates a status of completion of the one or more tasks assigned to the particular individual,
    updating the database with the completion information, and
    sending a second email message to the email address of the particular individual, wherein the second email includes the completion information.

2. The method of claim 1, wherein the second email message further includes additional data stored in the database.

3. The method of claim 2, wherein the completion information further describes one or more facilities, and the information includes, for each of the one or more facilities, a percentage of tasks completed at a respective facility for a given time period.

4. The method of claim 1, wherein the data in the database further includes, for each of the individuals, whether the individual has administrative privileges, and wherein the determining whether to respond to the request for the information is further based on whether the email address from which the first email message was sent is associated with an individual that has administrative privileges.

5. An information management system that improves security of information stored in the system without requiring a user log in, the system comprising:
    at least one communications interface that receives a first email message, wherein the first email message includes an action type parameter that indicates a request for a report;
    a database that stores information that describes one or more individuals and one or more tasks assigned to a particular individual; and
    at least one processor that is communicatively coupled to the database and the at least one communication interface, wherein the at least one processor:
    receives, using the at least one communication interface, the first email message,
    determines whether to respond to the request for the report based on the action type parameter and an email address of the particular individual,
    in response to a determination to respond to the request for the report:
    automatically generates completion information based on the first email that indicates a status of completion of the one or more tasks assigned to the particular individual,
    updates the database with the completion information, and
    sends, using the at least one communications interface, a second email message to the email address of the particular individual, wherein the second email message includes the completion information.

6. The information management system of claim 5, wherein the database is further configured to store information that describes one or more facilities, and the completion information further includes, for each of the one or more facilities, information that indicates a percentage of tasks completed at the respective facility for a given time period.

7. The information management system of claim 5, further comprising:
    the database an email address associated with each of the one or more individuals;
    wherein the at least one processor further determines whether to respond to the request for the report based on whether the email address from which the first email message was sent is an email address associated with one of the individuals.

8. The information management system of claim 7, wherein the database further stores information that includes, for each of the individuals, whether the individual has administrative privileges, and
    wherein the at least one processor further determines whether to respond to the request for the report based on whether the email address from which the first email message was sent is associated with an individual that has administrative privileges.

9. A non-transitory computer-readable storage medium having processor-executable instructions stored thereon which, when executed by at least one processor in the information management system, will cause the at least one processor to perform the method of claim 1.

10. The non-transitory computer-readable storage medium of claim 9, wherein the completion information further describes one or more facilities, and the completion information includes, for each of the one or more facilities, information that indicates a percentage of tasks completed at the respective facility for a given time period.

11. The non-transitory computer-readable storage medium of claim 9, wherein the determining whether to respond to the request for the information is further based on whether the email address from which the first email message was sent is an email address associated with one of the individuals.

12. The non-transitory computer-readable storage medium of claim 11, wherein the determining whether to respond to the request for the information is further based on whether the email address from which the first email message was sent is associated with an individual that has administrative privileges.

* * * * *